US007820303B2

(12) United States Patent
Suzuki et al.

(10) Patent No.: US 7,820,303 B2
(45) Date of Patent: Oct. 26, 2010

(54) CONDUCTIVE MATERIAL FOR CONNECTING PART AND METHOD FOR MANUFACTURING THE CONDUCTIVE MATERIAL

(75) Inventors: Motohiko Suzuki, Shimonoseki (JP); Hiroshi Sakamoto, Shimonoseki (JP); Yukio Sugishita, Shimonoseki (JP); Riichi Tsuno, Shimonoseki (JP)

(73) Assignee: Kabushiki Kaisha Kobe Seiko Sho (Kobe Steel, Ltd.), Kobe-shi (JP)

( * ) Notice: Subject to any disclaimer, the term of this patent is extended or adjusted under 35 U.S.C. 154(b) by 891 days.

(21) Appl. No.: 11/574,768

(22) PCT Filed: Sep. 8, 2005

(86) PCT No.: PCT/JP2005/016553

§ 371 (c)(1), (2), (4) Date: Mar. 6, 2007

(87) PCT Pub. No.: WO2006/028189

PCT Pub. Date: Mar. 16, 2006

(65) Prior Publication Data

US 2008/0090096 A1 Apr. 17, 2008

(30) Foreign Application Priority Data

Sep. 10, 2004 (JP) ............................ 2004-264749
Dec. 27, 2004 (JP) ............................ 2004-375212

(51) Int. Cl.
*B32B 15/20* (2006.01)
*H01R 13/03* (2006.01)

(52) U.S. Cl. ....................... 428/647; 428/648; 428/675; 428/929; 439/887; 439/886

(58) Field of Classification Search ....................... None
See application file for complete search history.

(56) References Cited

U.S. PATENT DOCUMENTS 5,780,172 A * 7/1998 Fister et al. ................ 428/647

(Continued)

FOREIGN PATENT DOCUMENTS

AO 11-140569 5/1999

(Continued)

OTHER PUBLICATIONS

English machine translation of JP 2004-068026. Mar. 2004.*
English machine translation of JP 11-135226. May 1999.*

*Primary Examiner*—John J Zimmerman
(74) *Attorney, Agent, or Firm*—Oblon, Spivak, McClelland, Maier & Neustadt, L.L.P.

(57) ABSTRACT

There is provided a conductive material comprising a base material made up of a Cu strip, a Cu—Sn alloy covering layer formed over a surface of the base material, containing Cu in a range of 20 to 70 at.%, and having an average thickness in a range of 0.1 to 3.0 μm and an Sn covering layer formed over the Cu—Sn alloy covering layer having an average thickness in a range of 0.2 to 5.0 μm, disposed in that order, such that portions of the Cu—Sn alloy covering layer are exposed the surface of the Sn covering layer, and a ratio of an exposed area of the Cu—Sn alloy covering layer to the surface of the Sn covering layer is in a range of 3 to 75%.

16 Claims, 6 Drawing Sheets

U.S. PATENT DOCUMENTS

| | | | | |
|---|---|---|---|---|
| 6,040,067 | A | 3/2000 | Sugawara et al. | |
| 6,312,762 | B1 | 11/2001 | Sugawara et al. | |
| 6,336,979 | B1 | 1/2002 | Sugawara et al. | |
| 6,770,383 | B2 * | 8/2004 | Tanaka et al. | 428/646 |
| 7,700,883 | B2 * | 4/2010 | Masago et al. | 174/126.2 |
| 2003/0091855 | A1 * | 5/2003 | Tanaka et al. | 428/647 |
| 2003/0129441 | A1 | 7/2003 | Hara et al. | |
| 2003/0186597 | A1 * | 10/2003 | Suzuki et al. | 439/886 |
| 2004/0265618 | A1 * | 12/2004 | Tsuji et al. | 428/648 |
| 2007/0218312 | A1 * | 9/2007 | Sakuyama et al. | 428/647 |
| 2008/0188100 | A1 * | 8/2008 | Saitoh | 439/82 |
| 2008/0257581 | A1 * | 10/2008 | Masago et al. | 174/126.2 |
| 2009/0053553 | A1 * | 2/2009 | Masago et al. | 428/647 |
| 2009/0061253 | A1 * | 3/2009 | Yoshida et al. | 428/632 |
| 2010/0047112 | A1 | 2/2010 | Fugono et al. | |

FOREIGN PATENT DOCUMENTS

| | | | | |
|---|---|---|---|---|
| AP | 2004-68026 | | | 3/2004 |
| EP | 1 024 212 | A2 | | 8/2000 |
| EP | 1 026 287 | A1 | | 8/2000 |
| GB | 2 381 963 | | | 5/2003 |
| JP | 10 60666 | | | 3/1998 |
| JP | 11 135226 | | | 5/1999 |
| JP | 11-233228 | | * | 8/1999 |
| JP | 2000-021545 | | * | 1/2000 |
| JP | 2002 226982 | | | 8/2002 |
| JP | 2002 298963 | | | 10/2002 |
| JP | 2004 232014 | | | 8/2004 |
| JP | 2005-154819 | | * | 6/2005 |
| WO | WO 03/028159 | A2 | | 4/2003 |

* cited by examiner

X COVERING LAYER X
Y COVERING LAYER Y

Magn 200× ⊢—⊣ 100μm

X COVERING LAYER X
Y COVERING LAYER Y

Magn 200× ⊢—⊣ 100μm

X COVERING LAYER X
Y COVERING LAYER Y

Magn 200× 100 μm

X COVERING LAYER X
Y COVERING LAYER Y

Magn 200× 100 μm

CONDUCTIVE MATERIAL FOR CONNECTING PART AND METHOD FOR MANUFACTURING THE CONDUCTIVE MATERIAL

TECHNICAL FIELD

The present invention relates to a conductive material for a connecting part such as a connector terminal, bus bar, and so forth, used in electrical wiring mainly for automobiles, consumer equipment, and the like, and in particular, to a conductive material for a fitting type connecting part, of which reliability of electrical connection in applications as well as reduction in friction and wear upon insertion of a male form terminal into a female form terminal or pull-out of the former from the latter.

BACKGROUND ART

For the conductive material for the connecting part such as the connector terminal, bus bar, and so forth, used in electrical wiring for automobiles, consumer equipment, and the like, use is made of Cu or a Cu-alloy, with Sn plating applied thereto, (including an Sn-alloy plating such as solder plating and so forth) except the case of an important electrical circuit requiring high reliability of electrical connection, against a low-level signal voltage and current. Sn plating has been in widespread use because it is lower in cost in comparison with Au plating, and any other means for surface treatment. Among others, Sn plating containing no Pb from a standpoint of coping with recent regulations against material causing environmental impacts, and particularly, reflow Sn coating, and hot dip Sn coating, on which there have hardly been reported a case of short circuit trouble due to occurrence of whiskers, are now in the mainstream.

As a leap forward development has recently been made in electronics rapid progress has been seen in higher use of electrical equipment in, for example, automobiles, in an attempt to pursue safety, environmental friendliness, and driving comfort. As a result, there occurs an increase in the number of circuits, weight thereof, and so forth, leading to an increase in space occupied, and energy consumption, so that there arise requirements for a conductive material for a connecting part capable of providing a satisfactory performance required of the connecting part such as a connector terminal and so forth even in the case of a multi-way connector, further reduction in size as well as weight, and a connecting part mounted in an engine room.

The Sn plating is applied to the conductive material for the connecting part mainly for the purpose of providing a surface thereof with corrosion resistance while obtaining a low contact resistance at electrical contacts and junctions and securing solderability when the conductive materials for the connecting parts are joined together by soldering. An Sn covering layer is a very soft conductive film, and an oxidized surface film thereof is prone to fracture. Accordingly, in the case of a fitting type terminal made up of a male form terminal in combination with a female form terminal, electrical contacts, such as indents, ribs, and so forth, tend to easily form gastight contact due to adhesion occurring between the plating layers to be thereby rendered suitable for obtaining a low contact resistance. Further, in order to maintain the low contact resistance in applications, an Sn plating layer is preferably larger in thickness, and it is important to increase a contact pressure at which the electrical contacts are pressed against each other.

However, if the Sn plating layer is rendered larger in thickness, and the contact pressure at which the electrical contacts are pressed against each other is increased, this will cause an increase in a contact area between the Sn covering layers, and an increase in an adhesion force therebetween, so that there occurs an increase in a deformation resistance due to the Sn plating layer being turned up at the time of insertion of the terminal, and an increase in a shearing resistance for shearing adhesion, thereby resulting in an increase in an insertion force. A fitting type connecting part large in insertion force will cause poor efficiency of assembling work, and deterioration in electrical connection due to wrong fitting. Accordingly, there is a demand for terminals low in insertion force so that the total insertion force thereof does not become greater than that in the past even if the number of poles is increased.

Further, in the case of a small-sized Sn plated terminal, and so forth, with a reduced contact pressure under which electrical contacts are pressed against each other, for the purpose of reducing the insertion force thereof, and wear occurring thereto at the time of insertion of the terminal, and pull-out thereof, not only it becomes difficult to maintain a low contact resistance in subsequent applications but also the electrical contacts are caused to undergo slight sliding due to vibration, thermal expansion/contraction, and so forth, during applications, so that the small-sized Sn plating terminal will be susceptible to occurrence of a slight-sliding wear phenomenon causing an abnormal increase in contact resistance. It is presumed that the slight-sliding wear phenomenon is induced by wear occurring to the Sn covering layers at electrical contacts, due to the slight-sliding, and by deposition of a large amount of resultant Sn oxide between the electrical contacts, due to repetition of the slight-sliding. For reasons described as above, there is a demand for a terminal low in the insertion force, excellent in resistance to wear upon insertion thereof, and pull-out thereof as well as resistance to wear due to the slight-sliding so as to be capable of maintaining a low contact resistance in spite of an increase in the number of actions for the insertion and pull-out, and the slight-sliding occurring to the Sn plating layers at electrical contacts.

In the following Patent Documents 1 to 6, respectively, there is described material for a fitting type terminal, wherein an Ni plating layer as an undercoat is formed as necessary on the surface of a base material composed of Cu or a Cu-alloy, and after forming a Cu plating layer, and an Sn plating layer in that order on the top of the Ni plating layer, a reflow process is applied thereto, thereby forming a Cu—Sn alloy covering layer composed primarily of Cu6Sn5 phase. According to description in those Patent Documents, the Cu—Sn alloy covering layer formed by the reflow process is harder as compared with the Ni plating layer, and the Cu plating layer, and owing to presence of the Cu—Sn alloy covering layer as an undercoat layer of the Sn covering layer remaining on the uppermost surface of the material, it is possible to decrease the insertion force of the terminal Further, a low contact resistance can be maintained by the agency of the Sn covering layer present on the uppermost surface.

Furthermore, in the following Patent Documents 7 to 93 respectively, there is described material for a fitting type terminal, wherein a Cu plating layer as an undercoat is formed as necessary on the surface of a base material composed of Cu or a Cu-alloy, and after forming an Sn plating layer on the top of the Cu plating layer, a reflow process is applied thereto as necessary before heat treatment, thereby forming an intermetallic compound layer composed primarily of Cu—Sn, and an oxidized film layer as necessary in that order. According to description in those Patent Documents, a Cu—Sn alloy covering layer is formed on the surface of the material by the heat treatments thereby enabling the insertion force of the terminal to be further decreased.

Patent Document 1: JP-A No. 68026/2004
Patent Document 2: JP-A No. 151668/2003
Patent Document 3: JP-A No. 298963/2002
Patent Document 4: JP-A No. 226982/2002
Patent Document 5: JP-A No. 135226/1999
Patent Document 6: JP-A No. 60666/1998
Patent Document 7: JP-A No. 226645/2000
Patent Document 8: JP-A No. 212720/2000
Patent Document 9: JP-A No. 25562/1998

DISCLOSURE OF THE INVENTION

As the thickness of the Sn plating layer on the surface of the terminal becomes smaller, the insertion force of the terminal with the Cu—Sn alloy covering layer formed as the undercoat of the Sn plating layer is lowered. Further, the insertion force of the terminal with the Cu—Sn alloy covering layer formed on the surface thereof undergoes a further decrease. On the other hand, if the Sn plating layer becomes smaller in thickness there will arise a problem that there occurs an increase in contact resistance of a terminal in the case where the terminal is held in a high-temperature environment reaching 150° C. as, for example, in an engine room of an automobile for many hours. Further, if the Sn plating layer is small in thickness, both corrosion resistance and solderability undergo deterioration in addition, the Sn plating layer is susceptible to occurrence of the slight-sliding wear phenomenon. Thus, with the terminal of this type, there have not been obtained as yet satisfactory properties required of the fitting type terminal, such as a low insertion force, maintenance of a low contact resistance even in a corrosive environment or a vibrating environment after frequent insertions and pull-out of the terminal, and after the terminal being held in an high-temperature environment for many hours, and so forth, so that further improvements are required.

It is therefore an object of the invention to provide a conductive material for a connecting parts comprising a Cu—Sn alloy covering layer, and an Sn covering layer, formed on a surface of a base material composed of a Cu strip, having a low friction coefficient (low insertion force), and capable of maintaining reliability of electrical connection (low contact resistance) at the same time.

In accordance to a first aspect of the invention, there is provided a conductive material for a connecting part, comprising a base material made up of a Cu strip, a Cu—Sn alloy covering layer formed over a surface of the base material, containing Cu in a range of 20 to 70 at %, and having an average thickness in a range of 0.1 to 3.0 μm, and an Sn covering layer formed over the Cu—Sn alloy covering layer in such a manner that portions of the Cu—Sn alloy covering layer are exposed thereto, the Sn covering layer having an average thickness in a range of 0.2 to 5.0 μm, wherein a ratio of an exposed area of the Cu—Sn alloy covering layer to a surface of the conductive material is in a range of 3 to 75%.

In this connection, a region where a covering layer structure described as above is formed ray extend across either a whole surface of the base material, on one side or respective sides thereof, or only a portion of the surface of the base material, on the one side or the respective sides thereof.

With the conductive material for the connecting part, an average material surface exposure interval (an average exposure interval of the Cu—Sn alloy covering layer) between portions of the Cu—Sn alloy covering layer, exposed to the surface of the conductive material, in at least one direction, is preferably in a range of 0.01 to 0.5 mm.

The conductive material for the connecting part, may further comprise a Cu covering layer formed between the surface of the base material, and the Cu—Sn alloy covering layer. Further, the conductive material for the connecting part, may further comprise an Ni covering layer formed between the surface of the base material, and the Cu—Sn alloy covering layer. In such a case, the conductive material for the connecting part, may further comprise a Cu covering layer formed between the Ni covering layer, and the Cu—Sn alloy covering layer.

With the present invention, the Cu strip includes a Cu-alloy strip. Further, the Sn covering layer, the Cu covering layer, and Ni covering layer may be composed of an Sn-alloy, a Cu-alloy, and an Ni-alloy besides Sn metal, Cu metal, and Ni metal, respectively.

The conductive material for the connecting part, can be fabricated by a method comprising the steps of the steps of preparing a base material made up of a Cu strip, forming a Cu plating layers and an Sn plating layer in that order, over the surface of the base material, and applying a reflow process thereto, thereby forming a Cu—Sn alloy covering layer, and an Sn covering layer in that order.

That is, in accordance to a second aspect of the invention, there is provided a conductive material for a connecting part, comprising a base material made up of a Cu strip, a Cu—Sn alloy covering layer formed over a surface of the base material, containing Cu in a range of 20 to 70 at %, and having an average thickness in a range of 0.2 to 3.0 μm, and an Sn covering layer formed over the Cu—Sn alloy covering layer in such a manner that portions of the Cu—Sn alloy covering layer are exposed thereto, the Sn covering layer having an average thickness in a range of 0.2 to 5.0 μm, wherein a ratio of an exposed area of the Cu—Sn alloy covering layer to a surface of the conductive material is in a range of 3 to 75%, and the surface of the conductive material is subjected to a reflow process and an arithmetic mean roughness Ra of the surface of the material, in at least one direction, is not less than 0.15 μm, and the arithmetic mean roughness Ra thereof, in all directions, is not more than 3.0 μm.

Further, in accordance to a third aspect of the invention, there is provided a method for fabricating a conductive material for a connecting part, the method comprising the steps of preparing a base material made up of a Cu strip, rendering an arithmetic mean roughness Ra of a surface of the base material, in at least one direction, not less than 0.15 m, and the arithmetic mean roughness Ra thereof, in all directions, not more than 4.0 μm, forming a Cu plating layer, and an Sn plating layer in that order, over the surface of the base material, and applying a reflow process thereto, thereby forming a Cu—Sn alloy covering layer, and an Sn covering layer in that order from the surface of the base material.

The Sn plating layer is caused to melt and be fluidized by application of the reflow process to be thereby smoothed out, whereupon respective portions of the Cu—Sn alloy covering layer, at the projections of projections and depressions, formed in the base material, are exposed to the uppermost surface (the surface of the Sn covering layer) of the material. At this point in time, selection is made on an appropriate thickness of the Sn plating layer, according to surface roughness of the base material, such that the ratio of the exposed area of the Cu—Sn alloy covering layer to the surface of the material after the reflow process falls in the range of 3 to 75%. As to the surface roughness of the base material, an average interval Sm (an average value of interval s between ridges and pits, occurring in cycles, found from intersections of roughness curves crossing average lines) between the projections and depressions, as worked out in the at least one directon, Ls preferably in the range of 0.01 to 0.5 mm.

Further, a region where the covering layer structure described is formed on the surface of the base material having the surface roughness described as above may extend across either the whole surface of the base material, on one side or respective sides thereof, or only a portion of the surface of the base material, on the one side or the respective sides thereof.

The Cu—Sn alloy covering layer is formed by the reflow process through mutual diffusion of Cu from the Cu plating layer, and Sn from the Sn plating layer, whereupon there can be both the case where the Cu plating layer is completely eliminated and the case where portions of the Cu plating layer remain. There can be a case where Cu is fed from the base material as well depending on a thickness of the Cu plating layer. An average thickness of the Cu plating layer formed on the surface of the base material is preferably not more than 1.5 μm, and an average thickness of the Sn plating layer is preferably in a range of 0.3 to 8.0 μm. The average thickness of the Cu plating layer is preferably not less than 0.1 μm.

With the method for fabricating the conductive material for the connecting part, described as above, there can be the case where the Cu plating layer is not formed at all. In such a case, Cu for the Cu—Sn alloy covering layer is fed from the base material.

Still further, in accordance to a fourth aspect of the invention, there is provided a method for fabricating a conductive material for a connecting part, the method comprising the steps of preparing a base material made up of a Cu strip, causing a surface of the base material to have surface roughness so that an arithmetic mean roughness Ra, in at least one direction, is not less than 0.15 μm, and the arithmetic mean roughness Ra, in all directions, is not more than 4.0 μm, forming an Sn plating layer over the surface of the base material, and applying a reflow process thereto, thereby forming a Cu—Sn alloy covering layer, and an Sn covering layer in that order from the surface of the base material.

With the method for fabricating the conductive material for the connecting part, described as above, an Ni plating layer may be formed between the surface of the base material, and the Cu plating layer. An average thickness of the Ni plating layer is set to not more than 3.0 μm and in this case, an average thickness of the Cu plating layer is preferably set to a range of 0.1 to 1.5 μm.

Further, with the present invention, the Cu plating layer, the Sn plating layer, and the NI plating layer may be composed of a Cu-alloy, an Sn-alloy, and an Ni-alloy besides Cu metal, Sn metal, and Ni metal, respectively.

FIG. 1 schematically shows a sectional structure (after the reflow process) of the conductive material for the connecting part. In FIG. 1, a surface of a base material A, on one side thereof, (the surface on the upper side thereof, in the figure) is subjected to roughening treatment, and a surface of the base material A, on the other side thereof, is smooth A Cu—Sn alloy covering layer Y composed of particles with a diameter in a range of on the order of several to several tens of μm, formed along projections and depressions, respectively, is formed on the surface of the base material A, on the one side thereof, after the roughening treatment, and an Sn covering layer X is found melted and fluidized so as to be smoothed out, whereupon portions of the Cu—Sn alloy covering layer Y are seen exposed to the surface of the conductive material. The whole surface of the Cu—Sn alloy covering layer Y over the smooth surface of the base material A, on the other side thereof, is covered with the Sn covering layer X.

As the conductive material for the connecting part, according to the invention, a material desirable particularly from a standpoint of further lowering friction coefficient, preventing a slight-sliding wear phenomenon in a vibrating environment, and maintaining reliability of electrical connection (low contact resistance) In that environment is one wherein the surface of the material is subjected to the reflow process, the average thickness of the Cu—Sn alloy covering layer is in a range of 0.2 to 3.0 μm, and the arithmetic mean roughness Ra of the surface of the material, in at least one direction, is not less than 0.15 μm while the arithmetic mean roughness Ra thereof, in all directions, is not more than 3.0 μm. Because the surface of the conductive material has the projections and depressions, the portions of the Cu—Sn alloy covering layer Y exposed to the surface of the Sn covering layer X are seen protruded from the surface of the Sn covering layer X, as smoothed out. FIG. 2 schematically shows such a state where the Cu—Sn alloy covering layer Y is formed along the projections and depressions, respectively, on the surface of the base material A, on the one side thereof, after the roughening treatment, and the Sn covering layer X is melted and fluidized to be thereby smoothed out, so that the portions of the Cu—Sn alloy covering layer Y are exposed to the surface of the conductive material, and are protruded from the surface of the Sn covering layer X. With the conductive material for the connecting part, according to the invention, a thickness of the portion of the Cu—Sn alloy covering layer, exposed to the surface of the Sn covering layer, (thickness of the exposed portion thereof) is preferably not less than 0.2 μm.

Further, the conductive material for the connecting part is fabricated by a method whereby a surface of the base material is caused to have surface roughness so that an arithmetic mean roughness Ra, in at least one direction, is not less than 0.3 μm, and the arithmetic mean roughness Ra, in all directions, is not more than 4.0 μm, a Cu plating layer, and an Sn plating layer are formed in that order over the surface of the base material, and subsequently, a reflow process is applied thereto, thereby forming a Cu—Sn alloy covering layer, and an Sn covering layer in that order. By application of the reflow process, the Sn plating layer is caused to melted and fluidized to be thereby smoothed out, whereupon the respective portions of the Cu—Sn alloy covering layer, corresponding to the projections among those projections and depressions, formed in the base material, are exposed to the surface of the Sn covering layer. At this point in time, selection is made on the appropriate thickness of the Sn plating layer, according to the surface roughness of the base material, such that the surface of the base material after the reflow process has the surface roughness so that an arithmetic mean roughness Ra, in at least one direction, is not less than 0.15 μm, and the arithmetic mean roughness Ra, in all directions, is not more than 30 nm while the ratio of the exposed area of the Cu—Sn alloy covering layer to the surface of the material falls in the range of 3 to 75%. Then, the portions of the Cu—Sn alloy covering layer Y, exposed to the surface of the Sn covering layer, are protruded from the surface of the Sn covering layer.

Thus, the conductive material for the connecting part, according to the invention, is most of all characterized in that a relationship between the extent of the surface roughness of the base material and the thickness of the Sn covering layer is kept in an optimum scope. The conductive material for the connecting part, obtained in this way, has such extremely excellent properties as have never seen before. That is, it has both low friction coefficient, and low electrical contact resistance. In addition, by combining the relationship between the extent of the surface roughness of the base material and the thickness of the Sn covering layer with the application of the reflow process, it becomes possible to more reliably obtain the conductive material for the connecting part, having such excellent properties.

Since the conductive material for the connecting part, according to the invention, especially for use in the fitting type terminal, is capable of checking friction coefficient to a low level, an insertion force upon fitting a male terminal into a female terminal is low in the case where it is used for a multi-way connector, for example, in an automobile, so that assembling work can be efficiently carried out. Further, even after the material is held in a high-temperature environment for many hours, and in a corrosive environment, reliability of electrical connection (low contact resistance) can be maintained. In the case where the material in particular, has the arithmetic mean roughness Ra of the surface of the material, after the reflow process falling in the range as previously described, it is possible to further lower friction coefficient and to maintain high reliability of the electrical connection even in a vibrating environment. Furthermore, the material provided with the Ni plating layer as an undercoat layer can maintain more excellent reliability of the electrical connection even when disposed in a spot for application at a very high temperature such as an engine room and the like.

In the case where the conductive material for the connecting part, according to the invention, is used for the fitting type terminal it is preferable to use the material for both the male terminal, and the female terminal, however, material can be used for either the male terminal or the female terminal.

BEST MODE FOR CARRYING OUT THE INVENTION

Figure 1:
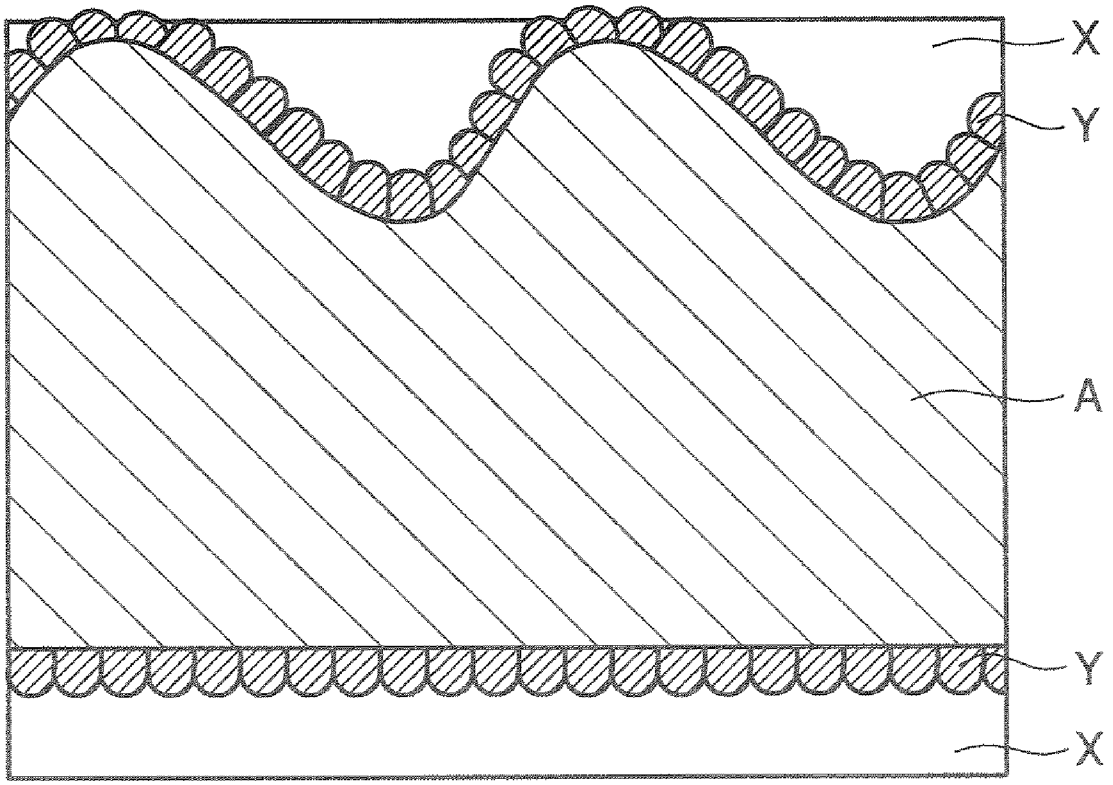
FIG. 1 is a conceptual view schematically showing a sectional structure of a conductive material for a connecting part, according to the invention.

Embodiments of a conductive material for a connecting part, according to the invention, are specifically described hereinafter.

(1) With reference to a Cu—Sn alloy covering layer, there is described hereinafter the reason why Cu content thereof is set to a range of 20 to 70 at. %. The Cu—Sn alloy covering layer with the Cu content in the range of 20 to 70 at. % is made of an intermetallic compound composed primarily of a Cu6Sn5 phase. The Cu6Sn5 phase is very hard in comparison with Sn or an Sn alloy, of which an Sn covering layer is formed, and if the Cu6Sn5 phase is formed so as to be partially exposed to the uppermost surface of the material, it is possible to check a deformation resistance due to Sn plating being turned up at the time of insertion of a terminal, and pull-out thereof, and a shearing resistance for shearing adhesion, thereby causing friction coefficient to be considerably lowered. In particular, if the Cu6Sn5 phase is partially protruded from the surface of the Sn covering layer, the hard Cu6Sn5 phase is subjected to a contact pressure at the time of electrical contacts undergoing sliding/slight-sliding upon the insertion of the terminal, and pull-out thereof, or in a vibrating environment, thereby enabling a contact area between the Sn covering layers to be further reduced, so that the friction coefficient can be rendered further lower, also resulting in reduction of oxidation as well as wear of the Sn covering layers, due to the slight-sliding. Meanwhile, a Cu3Sn phase is harder than the Cu6Sn5 phase, but is higher In Cu content as compared with the Cu6Sn5 phase, so that if the Cu3Sn phase is partially exposed to the surface of the Sn covering layer, there will be an increase in an amount of Cu oxides and so forth, formed on the surface of the material, due to oxidation with time, corrosion oxidation, and so forth, during application, so that a contact resistance is prone to increase, thereby rendering it difficult to maintain reliability of electrical connection. Further, there is a problem in that because the Cu3Sn phase is more brittle as compared with the Cu6Sn5 phase, the Cu3Sn phase is inferior in workability for forming, and so forth. Accordingly, the Cu—Sn alloy covering layer is specified to be composed of a Cu—Sn alloy with Cu content in the range of 20 to 70 at. %.

In portions of the Cu—Sn alloy covering layer, the Cu3Sn phase may be included, and the Cu—Sn alloy covering layer may include constituent elements of a base material and the Sn covering layer, and so forth. However, if the Cu content of the Cu—Sn alloy covering layer is less than 20 at. %, this will cause adhesiveness to increase, and render it difficult to lower the friction coefficient, thereby deteriorating resistance to wear due to the slight-sliding. On the other hand, if the Cu content exceeds 70 at. %, it becomes difficult to maintain the reliability of the electrical connection because of the oxidation with time, the corrosion oxidation, and so forth, resulting in deterioration of the workability for forming, and so forth. Accordingly, the Cu—Sn alloy covering layer is specified to have the Cu content in the range of 20 to 70 a. %, more preferably in a range of 45 to 65 at. %.

(2) There is described hereinafter the reason why an average thickness of the Cu—Sn alloy covering layer is set to a range of 0.1 (or 0.2) to 3.0 μm. With the present invention, a value obtained by dividing an area density (unit: $g/mm^2$) of Sn contained in the Cu—Sn alloy covering layer by a density (unit: $g/mm^3$) of Sn is defined as the average thickness of the Cu—Sn alloy covering layer. A method for measuring the average thickness of the Cu—Sn alloy covering layer, as described in the following embodiments, is based on such a definition as described. In the case where the average thickness of the Cu—Sn alloy covering layer is less than 0.1 μm, and the Cu—Sn alloy covering layer is partially exposed to the surface of the material as with the present invention, there occurs an increase in amount of Cu oxides and so forth, formed on the surface of the materials due to thermal diffusion such as high-temperature oxidation, and so forth, thereby rendering the material prone to an increase in contact resistances so that it becomes difficulty to maintain the reliability of electrical connection. Particularly, in the case where arithmetic mean roughness Ra of the surface of the material, subjected to the reflow process, is set to the range as previously described, the arithmetic mean roughness Ra is preferably set to not less than 0.2 μm. On the other hand, if the arithmetic mean roughness Ra exceeds 3.0 μm, this will render cost effectiveness disadvantageous and productivity poorer, and a hard layer is formed to a larger thickness, so that the workability for forming undergoes deterioration. Accordingly, the average thickness of the Cu—Sn alloy covering layer is specified to fall in the range of 0.1 to 3.0 μm, preferably in a range of 0.2 to 3.0 μm, and more preferably in a range of 0.3 to 1.0 μm.

(3) There is described hereinafter the reason why a ratio of an exposed area of the Cu—Sn alloy covering layer to the surface of the material is set to a range of 3 to 75%. With the present invention, the ratio of the exposed area of the Cu—Sn alloy covering layer to the surface of the material is worked out as a value of an exposed surface area of the Cu—Sn alloy covering layer, per unit surface area of the material, obtained after multiplication by 100. If the ratio of the exposed area of the Cu—Sn alloy covering layer to the surface of the material is less than 3%, there will occur an increase in amount of adhesion occurring between the Sn covering layers, and an increase in a contact area at the time of the insertion of the terminal, and pull-out thereof, so that it becomes difficult to lower friction coefficient, thereby deteriorating the resistance to wear due to the slight-sliding On the other hand, if the ratio of the exposed area of the Cu—Sn alloy covering layer to the surface of the material exceeds 75% there will be an increase in the amount of the Cu oxides and so forth, formed on the surface of the material, due to the oxidation with time, corrosion oxidation, and so forth, thereby rendering the material prone to an increase in contact resistance, so that it becomes difficult to maintain the reliability of electrical connection. Accordingly, the ratio of the exposed area of the Cu—Sn alloy covering layer to the surface of the material is specified to fall in the range of 3 to 75%, and more preferably in a range of 10 to 50%.

(4) There is described hereinafter the reason why an average thickness of the Sn covering layer is set to a range of 0.2 to 5.0 μm. With the present invention, a value obtained by dividing an areal density (unit: $g/mm^2$) of Sn contained in the Sn covering layer by a density (unit: $g/m^3$) of Sn is defined as the average thickness of the Sn covering layer (a method for measuring the average thickness of the Sn covering layer, as described in the following embodiments, is based on such a definition as described). If the average thickness of the Sn covering layer is less than 0.2 μm, there occurs an increase in the amount of the Cu oxides and so fort-h formed on the surface of the material, due to thermal diffusion such as high-temperature oxidation, and so forth, thereby rendering the material prone to an increase in contact resistance, and causing the corrosion resistance to deter-orate so that it becomes difficult to maintain the reliability of electrical connection. On the other hand, if the average thickness of the Sn covering layer exceeds 5.0 μm, this will render cost effectiveness disadvantageous, and productivity poorer. Accordingly, the average thickness of the Sn covering layer is specified to fall in the range of 0.2 to 5.0 μm, and more preferably in a range of 0.5 to 3.0 μm.

In the case where the Sn covering layer is composed of an Sn-alloy, constituent elements of the Sn alloy, other than Sn, may include Pb, Bi, Zn, Ag, Cu, and so forth. In the case of Pb, Pb content is preferably less than 50 mass %, and in the case of other elements, content thereof is preferably less than 10 mass %.

(5) With reference to the conductive material for the connecting part, according to the invention, there is described hereinafter the reason why the arithmetic mean roughness Ra of the surface of the material, after the reflow process, in at least one direction, is preferably not less than 0.15 μm, and the arithmetic mean roughness Ra thereof, in all directions, is preferably not more than 3.0 μm. If the arithmetic mean roughness Ra thereof, in the at least one direction, is less than 0.15 μm, a height to which the Cu—Sn alloy covering layer is protruded from the surface of the Sn covering layer is low as a whole, so that a ratio of the contact pressure, to which the hard Cu6Sn5 phase is subjected at the time of the electrical contacts undergoing sliding/slight-sliding, becomes smaller, and friction coefficient does not undergo much improvement, thereby decreasing an advantageous effect of reducing a depth of the wear of the Sn covering layer, due to the slight-sliding. On the other hand, if the arithmetic mean roughness Ra thereof, in all directions, exceeds 3.0 μm, there occurs an increase in the amount of the Cu oxides and so forth, formed on the surface of the material, due to the thermal diffusion such as high-temperature oxidation, and so forth, thereby rendering the material prone to an increase in the contact resistance, and causing the corrosion resistance to deteriorate, so that it becomes difficult to maintain the reliability of electrical connection. Accordingly, the surface roughness of the material, after the reflow process, is specified such that the arithmetic mean roughness Ra thereof, in the at least one direction, is not less than 0.15 μm, and the arithmetic mean roughness Ra thereof, in all the directions, is not more than 3.0 μm. The surface roughness of the material is more preferably in a range of 0.2 to 2.0 μm.

(6) With the conductive material for the connecting part, according to the invention, there is described hereinafter the reason why a thickness of a portion of the Cu—Sn alloy covering layer, exposed to the surface of the Sn covering layer, is preferably not less than 0.2 μm in the case where the arithmetic mean roughness Ra of the surface of the material, after the reflow process, in the at least one direction, is not less than 0.15 μm, and the arithmetic mean roughness Ra thereof, in all the directions, is not more than 3.0 μm. With the present invention, a measured value obtained by observation on a section of the material is defined as the thickness of the portion of the Cu—Sn alloy covering layer, exposed to the surface of the Sn covering layer (this differs from the method for measuring the average thickness of the Cu—Sn alloy covering layer, as previously described). In the case where the arithmetic mean roughness Ra of the surface of the material is in the range described as above, the portions of the Cu—Sn alloy covering layer are exposed to the surface of the Sn covering layer, and part of the portions are found protruded from a smoothed surface of the Sn covering layer. If the thickness of the portion of the Cu—Sn alloy covering layer, exposed to the surface of the Sn covering layer, is less than 0.2μm, particularly in the case where the Cu—Sn alloy covering layer are formed so as to be partially exposed to the surface of the material as with the present invention; there occurs an increase in the amount of the Cu oxides and so forth,; formed on the surface of the material, due to the thermal diffusion such as high-temperature oxidation, and so forth, and corrosion resistance deteriorates, thereby rendering the material prone to an increase in the contact resistance, so that it becomes difficult to maintain the reliability of electrical connection. Accordingly, the thickness of the portion of the Cu—Sn alloy covering layer, exposed to the surface of the Sn covering layer, is preferably set to not less than 0.2 μm, and more preferably to not less than 0.3 μm.

(7) There is described hereinafter the reason why an average material surface exposure interval, on the surface of the material in at least one direction, (an average exposure interval of the Cu—Sn alloy covering layer) is set to a range of 0.01 to 0.5 mm. With the present invention, a value obtained by adding an average width of the portions of the Cu—Sn alloy covering layer, along a direction crossing a straight line drawn on the surface of the material (an average length thereof, along the straight line) to an average width of portions of the Sn covering layer, is defined as the material surface exposure interval. If the average material surface exposure interval of the Cu—Sn alloy covering layer is less than 0.01 there occurs an increase in the amount of the Cu oxides and so forth, formed on the surface of the material, due to the thermal diffusion such as high-temperature oxidation, and so forth, thereby rendering the material prone to an increase in the contact resistance, so that it becomes difficult to maintain the reliability of electrical connection. On the other hand, if the average material surface exposure interval exceeds 0.5 mm, there can be a case where it is difficult to obtain a low friction coefficient, particularly when a small sized terminal is in use. In general, if a terminal is small in size, a contact area between electrical contacts (parts for the insertion of the terminal, and pull-out thereof) in the shape of indents, ribs, and so forth becomes smaller, so that probability of contact between only the Sn covering layers upon the insertion of the terminal, and pull-out thereof will become higher. In consequence, an amount of adhesion of the Sn covering layers will increase, thereby rendering it difficult to obtain a low friction coefficient. Accordingly, the average material surface exposure interval of the Cu—Sn alloy covering layer is preferably in the range of 0.01 to 0.5 mm in the at least one direction on the surface of the material. The average material surface exposure interval of the Cu—Sn alloy covering layer is more preferably in the range of 0.01 to 0.5 mm in all directions. By so doing, the probability of the contact between only the Sn covering layers upon the insertion of the terminal, and pull-out thereof will become lower. The average material surface exposure interval is further preferably in a range of 0.05 to 0.3 mm.

(8) In the case of using a Cu-alloy containing Zn, such as brass, and red brass, for the base material, a Cu covering layer may be interposed between the base material, and the Cu—Sn alloy covering layer. The Cu covering layer refers to portions of a Cu plating layer, remaining after the application of the reflow process. It is well known that the Cu covering layer is useful in checking diffusion of Zn and any other constituent elements of the base material onto the surface of the material, thereby improving solderability, and so forth. If the Cu covering layer is excessively large in thickness, this will cause the workability for forming to deteriorate, thereby rendering cost effectiveness poorer, so that a thickness of the Cu covering layer is preferably not more than 3.0 μm.

Constituent elements of the base material, and so forth, in a small amount, respectively, may be mixed into the Cu covering layer. Further, if the Cu covering layer is composed of a Cu-alloy, constituents of the Cu-alloy, other than Cu, can include Sn, Zn, and so forth. In the case of Sn, Sn content is preferably less than 50 mass %, and respective contents of other elements are preferably less than 5 mass %.

(9) Further, an Ni covering layer may be interposed between the base material, and the Cu—Sn alloy covering layer (if the Cu covering layer is not present), or between the base material, and the Cu covering layer. It is Known that the Ni covering layer is useful in checking diffusion of Cu and the constituent elements of the base material onto the surface of the material, and preventing depletion of the Sn covering layer by checking growth of the Cu—Sn alloy covering layer while checking an increase in the contact resistance even after in use at high temperature for many hours, and is also useful in enhancement of resistance to corrosion caused by sulfurous acid gas. Further, diffusion of the Ni covering layer itself onto the surface of the material is checked by the Cu—Sn alloy covering layer, or the Cu covering layer. It can be said from this that the conductive material for the connecting part, with the Ni covering layer formed therein, is suitable for use, particularly in connecting parts of which heat resistance is required. If the Ni covering layer is excessively large in thickness, this will cause the workability for forming to deteriorate, thereby rendering the cost effectiveness poorer so that a thickness of the Cu covering layer is preferably not more than 3.0 μm.

The constituent elements of the base material, and so forth, in a small amount, respectively, may be mixed into the Ni covering layer. Further, if the Ni covering layer is composed of an Ni-alloy, constituents of the Ni-alloy, other than Ni, can include Cu, P, Co, and so forth. In the case of Cu, Cu content is preferably not more than 40 mass %, and respective contents of P, and Co are preferably not more than 10 mass %.

(10) With the conductive material for the connecting part, because of a possibility that projections and depressions in the surface of the Sn covering layer on the surface of the material will cause surface luster to be lowered, adversely affecting friction coefficient, and contact resistance, the surface of the material is preferably as smooth as possible. As a method for smoothing out the surface of the Sn covering layer that covers the material whose base material has conspicuous projections and depressions, there can be cited a mechanical method for carrying out grinding and polishing after forming the covering layers, and a method whereby the reflow process is applied to the Sn covering layer, however, in consideration of cost effectiveness, and productivity, the method whereby the reflow process is applied to the Sn covering layer is preferable. In order that the portions of the Cu—Sn alloy covering layer is formed so as to be exposed to the surface of the Sn covering layer as with the case of the present invention, in particular, it will be extremely difficult to carry out fabrication by use of any method other than the method whereby the reflow process is applied.

In the case where Sn plating is applied directly or through the intermediary of the Ni plating layer or the Cu plating layer to the surface of the material whose base material has the conspicuous projections and depressions, the surface of the Sn covering layer will reflect the surface form of the base material to thereby exhibit the conspicuous projections and depressions if the plating is excellent in macrothrowing power. When the reflow process is applied thereto, the surface of the Sn covering layer is smoothed out by an action of Sn in the projections of the surface in molten state flowing into the depressions of the surface, and further, the portions of the Cu—Sn alloy covering layer, melted in the course of the reflow process, come to be exposed to the surface of the Sn covering layer. Further, application of heating and melting treatment will enhance whisker resistance. A Cu—Sn diffusion alloy layer formed between the Cu plating layer and the Sn plating layer in molten state normally undergoes growth by reflecting the surface form of the base material. However, in the case where the projections and depressions in the surface of the base material are conspicuous, and the Cu—Sn alloy covering layer are formed such that portions thereof are protruded from the surface of the Sn covering layer, there arises a case where protruded portions of the Cu—Sn alloy covering layer are extremely small in thickness in comparison with the average thickness of the Cu—Sn alloy covering layer if conditions for the reflow process are inappropriate.

Now, there is specifically described hereinafter a method for fabricating the conductive material for the connecting part, according to the invention.

(1) With the conductive material for the connecting part, according to the invention, there exists the Sn covering layer having the average thickness in the range of 0.2 to 5.0 μm, the portions of the Cu—Sn alloy covering layer are exposed to the surface of the Sn covering layer, and the ratio of the exposed area of the Cu—Sn alloy covering layer to the surface of the Sn covering layer is in the range of 3 to 75%. In this connection, with a conventional conductive material for a connecting part, in a state where portions of a Cu—Sn alloy covering layer are exposed to the surface of an Sn covering layer, the Sn covering layer was found in such a state as completely or nearly eliminated.

In order to obtain the conductive material for the connecting part structured such that the portions of the Cu—Sn alloy covering layer are exposed to the surface of the Sn covering layer as with the present invention, firstly conceivable is a method whereby a growth rate of the Cu—Sn diffusion alloy layer is partially controlled (for example, a method whereby spots where the Cu—Sn diffusion alloy layer undergoes growth up to the surface are dispersedly formed on the surface of the material by microscopic spot heating with the use of a laser) if use is made of a common base material small in surface roughness. With this method, however, fabrication work is extremely difficult, and is, in addition, economically disadvantageous. Furthermore, with this method, it is not possible to obtain a covering layer makeup wherein the portions of the Cu—Sn alloy covering layer are protruded from the surface of the Sn covering layer.

The method according to the invention is a method whereby roughening treatment is applied to the surface of the base material, and subsequently, the Sn-plating applied directly, or through the intermediary of the Ni plating layer or the Cu plating layer, to the surface of the base material, followed by application the reflow process. Since this method is excellent in cost effectiveness and productivity, it is therefore considered as an optimum method for obtaining the conductive material for the connecting part, according to the invention. As a method for applying the roughening treatment to the surface of the base material, there can be cited a physical method such as ion etching, and so forth, a chemical method such as etching, electrolytic polishing, and so forth, and a mechanical method such as rolling (with the use of work rolls subjected to roughening treatment by polishing shot blasting, and so forth), polishing, shot blasting, and so forth. As a method excellent in productivity, economics, reproducibility of the surface form of the base material, the rolling or the polishing is preferable above all. Hence, it need only be sufficient to carry out rolling with the use of rolls with a surface coarser than that for conventional rolls or to apply polishing finish coarser than that in the past.

In the case where the Ni plating layer, the Cu plating layer, and the Sn plating layer are composed of an Ni-alloy a Cu-alloy, and an Sn-alloy, respectively, use can be made of the respective alloys as previously described with reference to the Ni covering layer, the Cu covering layer, and Sn covering layer.

(2) Now, with reference to the surface roughness of the base material, there is described hereinafter the reason why the arithmetic mean roughness Ra in the at least one direction, is set to not less than 0.5 μm, and the arithmetic mean roughness Ra in all the directions is set to not more than 4.0 μm. If the arithmetic mean roughness Ra in the at least one direction is less than 0.15 μm, it will be extremely difficult to fabricate the conductive material for the connecting part, according to the invention. More specifically, it will be extremely difficult to maintain the ratio of the exposed area of the Cu—Sn alloy covering layer to the surface of the material in the range of 3 to 75% while maintaining the average thickness of the Sn covering layer in the range of 0.2 to 5.0 μm at the same time. On the other hand, if the arithmetic mean roughness Ra in all directions is in excess of 4.0 μm, it will be difficult to smooth out the surface of the Sn covering layer through fluidization of molten Sn or Sn-alloy. Accordingly, the surface roughness of the base material is specified such that the arithmetic mean roughness Ra in the at least one direction is not less than 0.15 μm, and the arithmetic mean roughness Ra in all the directions not more than 4.0 μm With the surface roughness of the base material kept as specified, the portions of the Cu—Sn alloy covering layer, having grown due to the reflow process, are exposed to the surface of the material as a result of the fluidization of the molten Sn or Sn-alloy (planarization of the Sn covering layer).

Further, with reference to the surface roughness of the base material, the arithmetic mean roughness Ra in the at least one direction is preferably not less than 0.3 μm When the base material has the surface roughness described as above, the arithmetic mean roughness Ra in the at least one direction on the surface of the material after the reflow process can be rendered not less than 0.15 μm, the arithmetic mean roughness Ra in all the directions not more than 3.0 μm, and further, the ratio of the exposed area of the Cu—Sn alloy covering layer to the surface of the material can be rendered in the range of 3 to 75% while concurrently maintaining the average thickness of the Sn covering layer in the range of 0.2 to 5.0 μm. In this case, the portions of the Cu—Sn alloy covering layer, exposed to the surface of the material, exist in such a state as protruded from the surface of the Sn covering layer.

Further, with reference to the surface roughness of the base material, the arithmetic mean roughness Ra in the at least one direction is more preferably not less than 0.4 μm while the arithmetic mean roughness Ra in all the directions is not more than 3.0 μm.

(3) Further, with reference to the surface roughness of the base material, there is described hereinafter the reason why an average interval Sm between the projections and depressions, as worked out in at least one direction, is set to the range of 0.1 to 0.5 mm. The method according to the invention is the method whereby the roughening treatment is applied to the surface of the base material, and subsequently, the Sn plating is applied directly, or through the intermediary of the NI plating layer or the Cu plating layer, to the surface of the base material, followed by application of the reflow process, and as previously described, the average material surface exposure interval (an average exposure interval of the Cu—Sn alloy covering layer) in the at least one direction, on the surface of the material, is preferably in the range of 0.01 to 0.5 mm. Since the Cu—Sn diffusion alloy layer formed between the molten Sn plating layer and the Cu-alloy base material or the Cu plating layer normally undergoes growth by reflecting the surface form of the base material, the average material surface exposure interval approximately reflects the average interval Sm between the projections and depressions on the surface of the base material. Accordingly, with reference to the surface roughness of the base material, the average interval Sm between the projections and depressions, as worked out in the at least one direction, is preferably in the range of 0.01 to 0.5 mm, and more preferably in a range of 0.05 to 0.3 mm By adjusting the surface roughness of the base material, it becomes possible to control the exposure interval between adjacent portions of the Cu—Sn alloy covering layer, exposed to the surface of the material.

(4) Further, the reflow process is carried out under a reflow condition of a reflow temperature between a melting point of the Sn plating layer and 600° C. for reflow time in a range of 3 to 30 seconds. Sn metal is not melted if a heating temperature is lower than 230° C., and the heating temperature is preferably not lower than 240° C. to obtain the Cu—Sn alloy covering layer with Cu content not excessively low, however, if the melting temperature exceeds 600° C., the base material will be softened while distort ion will occur thereto, and the Cu—Sn alloy covering layer with excessively high Cu content will be formed at the same time, so that it is not possible to maintain a low contact resistance. If heating time is shorter than 3 seconds, uneven heat transfer will occur, so that it is not possible to form the Cu—Sn alloy covering layer having a sufficient thickness, and if the heating time is exceeds 30 seconds, oxidation proceeds on the surface of the material, resulting in an increase of the contact resistance, so that the resistance to the wear due to the slight-sliding will deteriorate.

By carrying out the reflow process, the Cu—Sn alloy covering layer is formed, and the surface of the Sn covering layer is smoothed out through the fluidization of the molten Sn or Sn-alloy, whereupon the portions of the Cu—Sn alloy covering layer, not less than 0.2 μm in thickness, are exposed to the surface of the material. Further, plating grains increase in size and plating stress decreases, so that whiskers no longer occur. In any case, in order to cause the Cu—Sn alloy covering layer to undergo uniform growth, heat treatment is preferably applied at a temperature for melting Sn or Sn-alloy, not higher than 300° C., and generating as small heat quantity as possible.

(5) With reference to the method for fabricating the conductive material, according to the invention, there has so far been described the method whereby the Sn plating layer is formed directly, or through the intermediary of the NI plating layer or the Cu plating layer, on the surface of the base material, and the Cu—Sn alloy covering layer is formed by the reflow process while concurrently smoothing out the surface of the material, however, the covering layer makeup of the conductive material for the connecting part, according to the invention, can also be obtained by a method whereby the Cu—Sn alloy covering layer is formed directly, or through the intermediary of the NI plating layer on the surface of the base material, and over the Cu—Sn alloy covering layer, the Sn covering layer is formed before applying the reflow process. The latter method as well is included in the scope of the present invention.

Figure 2:
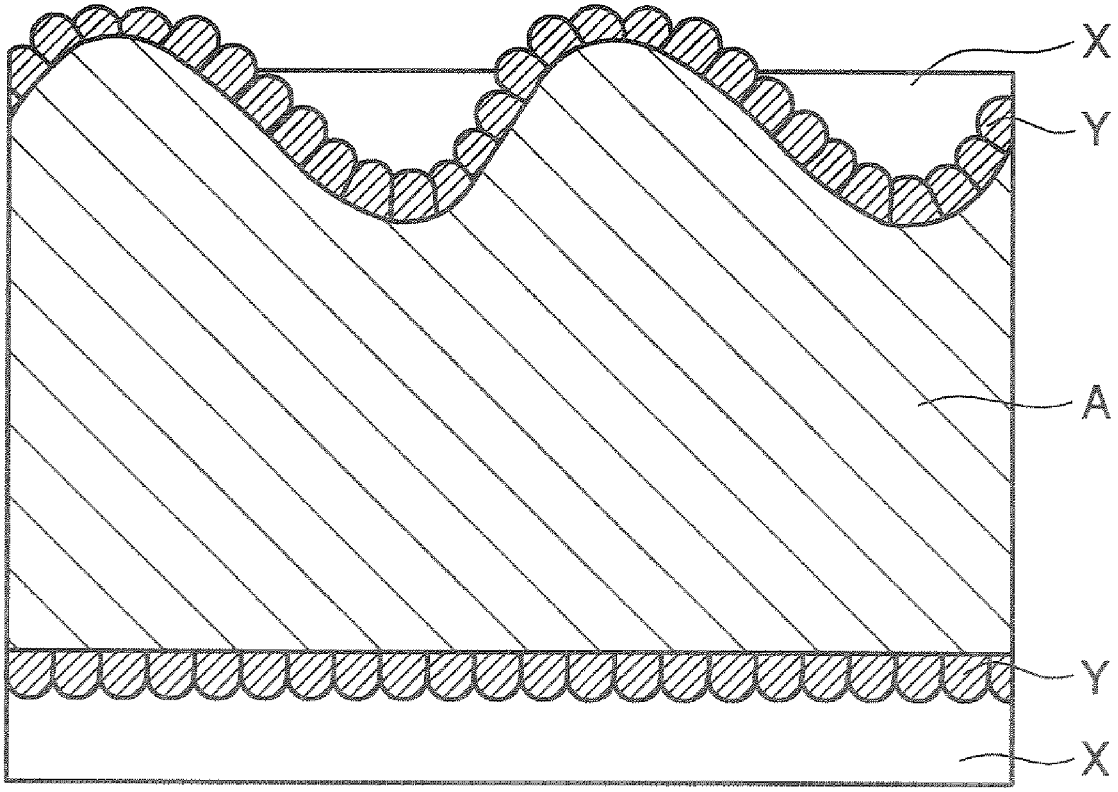
FIG. 2 is another conceptual view schematically showing a sectional structure of the conductive material for the connecting part, according to the invention.

FIGS. 1, 2 each schematically show a sectional structure (after the reflow process) of the conductive material for the connecting part, according to the invention.

Thus, with the conductive material for the connecting part, according to the invention, because the Cu—Sn alloy covering layer that is effective in causing a decrease in the insertion force of the terminal at the time of the insertion of, and the pull-out of the terminal is exposed to the surface of the base material under an appropriate condition, the friction coefficient can be kept low even if the Sn covering layer is formed to a large thickness, and the reliability of electrical connection (the low contact resistance) can be maintained by the agency of the Sn covering layer.

Further, it need only be sufficient if the covering layers in at least portions of the conductive material for the connecting part, where the terminal is inserted and pulled out, are made up such that the Cu—Sn alloy covering layer with the Cu content in the range of 20 to 70 at. %, having the average thickness in the range of 0.1 to 3.0 μm, and the Sn covering layer having the average thickness in the range of 0.2 to 5.0 μm are formed in that order, the Cu—Sn alloy covering layer is formed such that the portions thereof are exposed to the surface of the Sn covering layer, and the ratio of the exposed area of the Cu—Sn alloy covering layer to the surface of the material is in the range of 3 to 75%, or the Cu—Sn alloy covering layer with the Cu content in the range of 20 to 70 at. %, having the average thickness in the range of 0.2 to 3.0 μm, and the Sn covering layer with the average thickness in the range of 0.2 to 5.0 μm are formed in that order, the surface of the material is subjected to the reflow process, the arithmetic mean roughness Ra of the surface of the material, after the reflow process, in the at least one direction, is not less than 0.15 μm, and the arithmetic mean roughness Ra thereof, in all the directions, is not more than 3.0 μm, the Cu—Sn alloy covering layer is formed such that the portions thereof are exposed to the surface of the Sn covering layer, and the ratio of the exposed area of the Cu—Sn alloy covering layer to the surface of the material is in the range of 3 to 75%. The covering layer makeup in portions (for example, junctions between the terminal and wire or a printed wiring board) of the conductive material for the connecting part, where the insertion of, and pull-out of the terminal is not carried out, may not meet the specifications described as above. However, if the conductive material for the connecting part, described in the foregoing, is applied to the portions thereof, where the insertion of, and pull-out of the terminal is not carried out, this will enable the reliability of electrical connection to be further enhanced.

The invention will be more specifically described hereinafter with reference to the following embodiments by focusing on principal points of the invention, but it is to be pointed out that the invention be not limited thereto.

EMBODIMENT 1

[Fabrication of Cu-Alloy Base Materials]

Table 1 snows chemical compositions of Cu-alloys (working examples Nos. 1, 2) used in the fabrication of Cu-alloy base materials. With the present embodiment, those Cu-alloys were subjected to surface roughening treatment by the mechanical method (rolling or polishing) to be finished into Cu-alloy base materials with a predetermined surface roughness, respectively, and having a thickness of 0.25 mm. The surface roughness was measured by the following procedure.

[Method for Measuring the Surface Roughness of the Cu-alloy Base Material]

The surface roughness of the Cu-alloy base material was measured on the basis of JIS B0601-1994 by use of a contact type surface-roughness tester (Surfcom 1400 model manufactured by Tokyo Seimitsu Co., Ltd.) The surface roughness was measured on a condition of a cutoff value at 0.8 mm, a reference length 0.8 mm, an evaluation length 4.0 mm, a measuring rate at 0.3 mm/s, and a stylus tip radius at 5 μm R. Further, a direction (a direction in which the surface roughness is exhibited at its maximum) orthogonal to a direction in which rolling or polishing was carried out at the time of the surface roughening treatment was adopted for a surface-roughness measuring direction.

TABLE 1

| Cu-alloy | Chemical Composition | | | | |
|---|---|---|---|---|---|
| (working example Nos.) | Cu (mass %) | Fe (mass %) | P (mass %) | Sn (mass %) | Zn (mass %) |
| 1 | balance | 0.1 | 0.03 | 2.0 | — |
| 2 | 70 | — | — | — | balance |

With respective test pieces, Cu plating was applied to the respective Cu-alloy base materials thereof, with the surface roughening treatment applied thereto, (except for the test pieces Nos. 7, and 8), to a thickness 0.15 μm in the case of the Cu-alloy No. 1, and to a thickness 0.65 μm in the case of the Cu-alloy No. 2, and further, Sn plating was applied thereto to a thickness 1.0 μm before the reflow process at 280° C. was applied for 10 seconds, thereby having obtained the test pieces (Nos. 1 to 10). Table 2 shows respective conditions under which those test pieces were fabricated. Among parameters for the surface roughness of the base material, the average interval Sm between the projections and the depressions was found in the preferable range as previously described (the range of 0.01 to 0.5 mm) with respect to all the test pieces. Further, the average thickness of the Cu plating layer, and that of the Sn plating layer, shown in Table 2, were measured by respective procedures described hereinafter.

TABLE 2

| Test Piece No. | Base Material: Alloy No. | Base Material: Arithmetic Mean Roughness Ra (μm) | Ni plating Average Thickness (μm) | Cu Plating Average Thickness (μm) | Sn Plating Average Thickness (μm) | Reflow Process: Temperature (° C.) | Reflow Process: Time (s) |
|---|---|---|---|---|---|---|---|
| 1 | 1 | 0.4 | — | 0.15 | 1.0 | 280 | 10 |
| 2 | 2 | 0.4 | — | 0.65 | 1.0 | 280 | 10 |
| 3 | 1 | 0.8 | — | 0.15 | 1.0 | 280 | 10 |
| 4 | 2 | 0.8 | — | 0.65 | 1.0 | 280 | 10 |
| 5 | 1 | 1.3 | — | 0.15 | 1.0 | 280 | 10 |
| 6 | 2 | 1.3 | — | 0.65 | 1.0 | 280 | 10 |
| 7 | 1 | 0.05 | — | 0.15 | 1.0 | 280 | 10 |
| 8 | 2 | 0.05 | — | 0.65 | 1.0 | 280 | 10 |
| 9 | 1 | 2.2 | — | 0.15 | 1.0 | 280 | 10 |
| 10 | 2 | 2.2 | — | 0.65 | 1.0 | 280 | 10 |

[Method for Measuring the Average Thickness of the Cu Plating Layer]

A section of each of the test pieces before the reflow process, prepared by microtomy, was observed at 10,000× magnification with the use of an SEM (a scanning electron microscope) to thereby work out the average thickness of the Cu plating layer by an image analysis process.

[Method for Measuring the Average Thickness of the Sn Plating Layer]

The average thickness of the Sn plating layer of each of the test pieces before the reflow process was worked out with the use of a fluorescent X-ray coating thickness gauge (SFT3200 manufactured by Seiko Instruments Inc. Measurement was taken on a condition that single-layer analytical curves of Sn/the base material were used for analytical curves, and a collimator diameter was ϕ 0.5 mm.

Now, Table 3 shows a covering layer makeup of the test pieces as obtained. The average thickness of the Cu—Sn alloy covering layer, the Cu content thereof, the ratio of the exposed area thereof to the surface of the material, and the average thickness of the Sn covering layer were measured by respective procedures described hereunder. Further, every exposure interval between the portions of the Cu—Sn alloy covering layer, exposed to the uppermost surface, was found in the preferable range previously described (the range of 0.01 to 0.5 mm).

[Method for Measuring the Average Thickness of the Cu—Sn Alloy Covering Layer]

First, the test pieces each were immersed in an aqueous solution of p-nitrophenol, and sodium hydroxide for 10 minutes to thereby remove the Sn covering layer. Thereafter, measurement was taken on a film-thickness of Sn content of the Cu—Sn alloy covering layer with the use of the fluorescent X-ray coating thickness gauge (SFT3200 manufactured by Seiko Instruments Inc.) Measurement was taken on a condition that the single-layer analytical curves of Sn/the base material were used for the analytical curves, and the collimator diameter was ϕ 0.5 mm. The average thickness of the Cu—Sn alloy covering layer was worked out by defining a value thus obtained as the average thickness.

[Method for Measuring the Cu Content of the Cu—Sn Alloy Covering Layer]

First, the test pieces each were immersed in an aqueous solution of p-nitrophenol, and sodium hydroxide for 10 minutes to thereby remove the Sn covering layer. Thereafter, the Cu content of the Cu—Sn alloy covering layer was found by quantitative analysis using an EDX (energy dispersive X-ray spectrometer).

[Method for Measuring the Ratio of the Exposed Area of the Cu—Sn Alloy Covering Layer]

Figure 3:
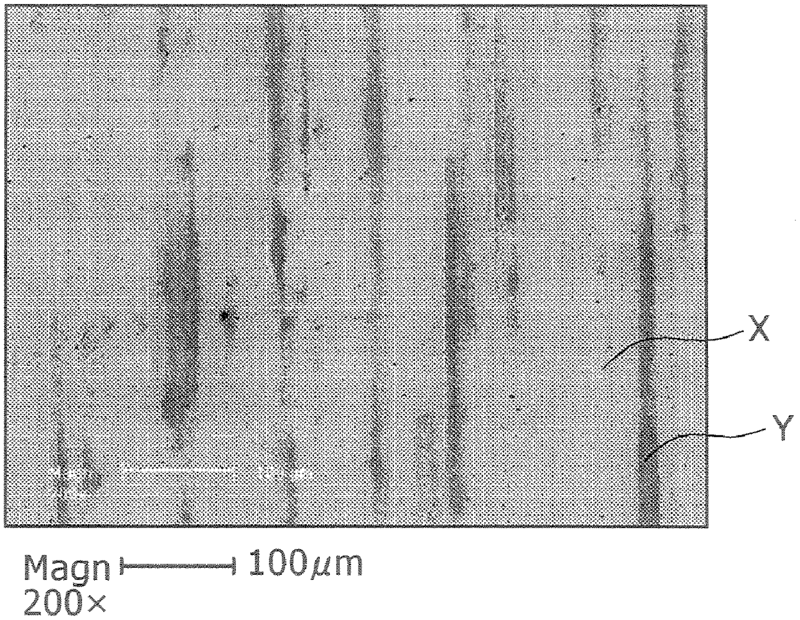
FIG. 3 shows a composition image of a test piece No. 1, taken by a scanning electron microscope, showing the uppermost structure thereof.
Figure 4:
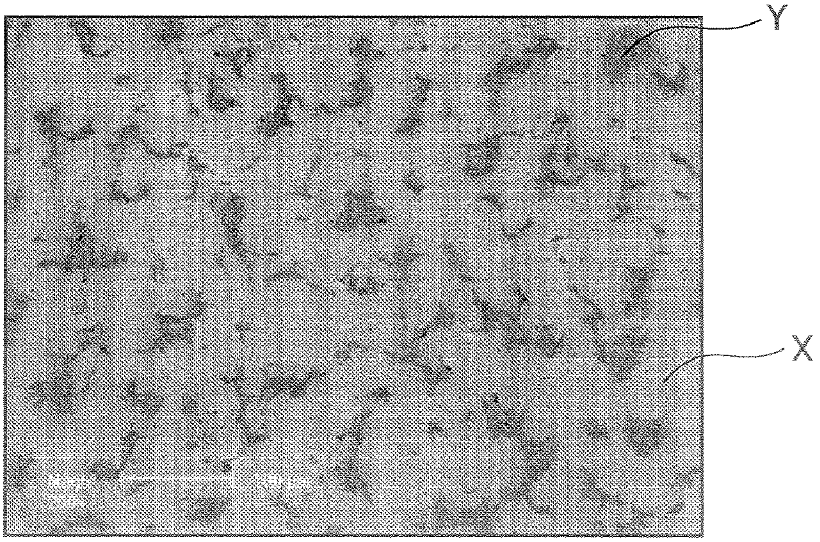
FIG. 4 shows a composition image of a test piece No. 2 taken by the scanning electron microscope, showing the uppermost structure thereof.

A surface of each of the test pieces was observed at 200× magnification by use of an SEM (a scanning electron microscope) with the EDX (energy dispersive X-ray spectrometer) mounted therein, and through image analysis made on the basis of light and shade (excluding contrast such as stain, scratch, and so forth) in a composition image thus obtained, the ratio of the exposed area of the Cu—Sn alloy covering layer to the surface of the material was measured. FIG. 3 shows the composition image of the test piece No. 1, and FIG. 4 shows the composition image of the test piece No. 3. The test piece No. 1 was subjected to the surface roughening treatment by polishing, and the test piece No. 3 was subjected to the surface roughening treatment by rolling.

[Method for Measuring the Average Material Surface Exposure Interval of the Cu—Sn Alloy Covering Layer]

A surface of each of the test pieces was observed at 200× magnification by use of the SEM (the scanning electron microscope) with the EDX (the energy dispersive X-ray spectrometer) mounted therein, and the average material surface exposure interval of the Cu—Sn alloy covering layer was measured by finding an average of values obtained by adding the average width of the portions of the Cu—Sn alloy covering layer, along the direction crossing the straight line drawn on the surface of the material (the average length along the straight line) to the average width of the portions of the Sn covering layer on the basis of a composition image obtained as above. A measurement direction (a direction in which the straight line was drawn) was a direction orthogonal to a direction of rolling, or polishing, carried out at the time of the surface roughening treatment.

[Method for Measuring the Average Thickness of the Sn Covering Layer]

With the respective test pieces, measurement was first taken on the sum of a film thickness of the Sn covering layer and a film thickness of an Sn component of the Cu—Sn alloy covering layer with the use of the fluorescent X-ray coating thickness gauge (SET3200 manufactured by Seiko Instruments Inc.). Thereafter, the test pieces each were immersed in an aqueous solution of r-nitrophenol, and sodium hydroxide for 10 minutes to thereby remove the Sn covering layer. The film thickness of the Sn component of the Cu—Sn alloy covering layer was measured again with the use of the fluorescent X-ray coating thickness gauge. Measurement was taken on a condition that the single-layer analytical curves of Sn/the base material were used for the analytical curves, and the collimator diameter was ϕ 0.5 mm. The average thickness of the Sn covering layer was computed by subtracting the film thickness of the Sn component of the Cu—Sn alloy covering layer from the sum of the film thickness of the Sn covering layer, and the film thickness of the Sn component of the Cu—Sn alloy covering layer, obtained as above.

tion (sliding rate at 80 mm/min) with the use of a horizontal-load measuring apparatus (model-2152 manufactured by Aiko Engineering Co., Ltd.), thereby having measured a maximum friction force F (unit: N) up to a slidable distance 5 mm. Friction coefficient was found by the following expression (1) In the figure, reference numeral 5 denotes a load cell, and an arrow denotes a slidable direction.

$$\text{friction coefficient} = F/3.0 \qquad (1)$$

[Evaluation Test for Contact Resistance After Being Left Out at High Temperature]

Heat treatment at 160° C.×120 hr in the air was applied to the respective test pieces, and subsequently, contact resistance was measured by the four-terminal method under a condition of open voltage 20 mV, current 10 mA and no sliding.

[Evaluation Test for Contact Resistance after Salt Spray Test]

A salt spray test at 35° C.×6 hr using an aqueous solution of 5% NaCl was carried out on the respective test pieces in accordance with JIS Z2371-2000, and subsequently contact resistance was measured by the four-terminal method under the condition of open voltage 20 mV, current 10 mA, and no sliding.

TABLE 3

| Test Piece No. | Cu—Sn Alloy Covering Layer: Average Temperature (μm) | Cu—Sn Alloy Covering Layer: Cu content (at. %) | Cu—Sn Alloy Covering Layer: Exposed area ratio (%) | Sn Covering Layer Average Thickness (μm) | Friction Coefficient | Contact Resistance after being left out at high temperature (mΩ) | Contact Resistance after salt spray test (mΩ) |
|---|---|---|---|---|---|---|---|
| 1 | 0.3 | 55 | 10 | 0.7 | 0.32 | 20 | 8 |
| 2 | 0.3 | 55 | 10 | 0.7 | 0.33 | 30 | 5 |
| 3 | 0.3 | 55 | 30 | 0.7 | 0.25 | 30 | 15 |
| 4 | 0.3 | 55 | 30 | 0.7 | 0.26 | 40 | 15 |
| 5 | 0.3 | 55 | 50 | 0.7 | 0.25 | 50 | 25 |
| 6 | 0.3 | 55 | 50 | 0.7 | 0.24 | 75 | 20 |
| 7 | 0.3 | 55 | 0 | 0.7 | 0.55 | 15 | 3 |
| 8 | 0.3 | 55 | 0 | 0.7 | 0.53 | 25 | 3 |
| 9 | 0.3 | 55 | 80 | 0.7 | 0.24 | 160 | 130 |
| 10 | 0.3 | 55 | 80 | 0.7 | 0.25 | 250 | 110 |

Furthers the respective test pieces as obtained were subjected to a friction coefficient evaluation test, an evaluation test for contact resistance after being left out at high temperature, and an evaluation test for contact resistance after the salt spray test, respectively conducted by respective procedures described hereunder. Results of those tests are also shown in Table 3.

[Friction Coefficient Evaluation Test]

Figure 5:
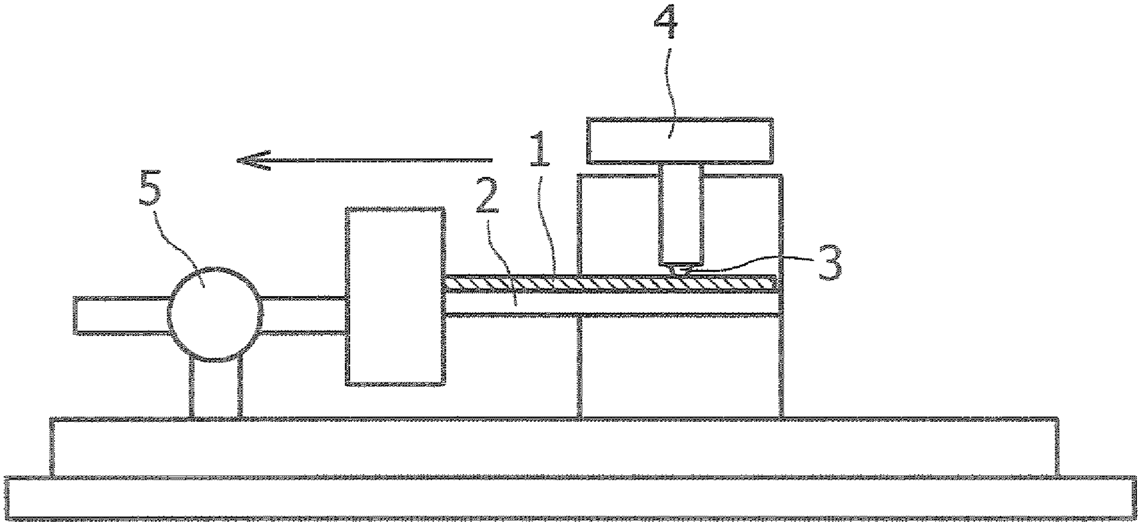
FIG. 5 is a conceptual view of a jig for measuring friction coefficient.

Evaluation was made by simulating the shape of an indent of an electrical contact inn a fitting type connecting part with the use of an apparatus as shown in FIG. 5. First, a male specimen 1 prepared from a sheet material cut out from the respective test pieces was fixedly attached to a horizontal platform 2, and on the top of the male specimen 1, a female 3 prepared from a hemisphere-shaped workpiece (ϕ 1.5 mm in inside diameter) cut out from the test piece No. 7 shown in Table 3 was placed such that respective covering layers of both the specimens were brought into contact with each other.

Subsequently, a load (weight 4) of 3.0 N was imposed on the female specimen 3 to press down the male specimen 1, and the male specimen 1 was pulled in the horizontal direc- As shown in Table 3 the test pieces Nos. 1 to 6 meet requirements for the covering layer makeup, as specified in the invention, and are found low in friction coefficients exhibiting excellent properties in respect of either the contact resistance after those are left out at high temperature for many hours, or the contact resistance after the salt spray test.

On the other hand, as to the test pieces Nos. 7, 8, respectively, since the surface of a base material thereof was smooth, the ratio of the exposed area of the Cu—Sn alloy covering layer was at 0%, and frictional resistance was found large. In the case of the test pieces Nos. 9, 10, respectively the average thickness of the Sn plating layer was small in comparison with a relatively large arithmetic mean roughness Ra of the surface of a base material, so that the ratio of the exposed area of the Cu—Sn alloy covering layer became excessively large, resulting in an increase in the contact resistance. With the test pieces Nos. 9, 10, it is possible to obtain the covering layer makeup meeting the requirements of the invention if the average thickness of the Sn plating layer is increased.

EMBODIMENT 2

With respective test pieces, Cu plating was applied to a thickness of 0.15 μm to a base material made of the Cu-alloy No. 1, with the surface roughening treatment applied thereto, and further, Sn plating was applied thereto to respective thicknesses before the reflow process at 280° C. was applied for 10 seconds, thereby having obtained the test pieces (Nos. 11 to 19). Table 4 shows respective conditions under which those test pieces were fabricated. Among parameters for the surface roughness of the base material, the average interval Sm between the projections and the depressions was found in the preferable range as previously described (the range of 0.01 to 0.5 mm) with respect to all the test pieces. Further, the average thickness of the Cu plating layer, and that of the Sn plating layer, shown in Table 4, were measured by the same procedures as those described with reference to Embodiment 1.

TABLE 4

| Test Piece No. | Base Material: Alloy No. | Base Material: Arithmetic Mean Roughness Ra (μm) | Ni plating Average Thickness (μm) | Cu Plating Average Thickness (μm) | Sn Plating Average Thickness (μm) | Reflow Process: Temperature (° C.) | Reflow Process: Time (s) |
|---|---|---|---|---|---|---|---|
| 11 | 1 | 0.3 | — | 0.15 | 0.8 | 280 | 10 |
| 12 | 1 | 0.5 | — | 0.15 | 0.8 | 280 | 10 |
| 13 | 1 | 0.8 | — | 0.15 | 0.8 | 280 | 10 |
| 14 | 1 | 2.0 | — | 0.15 | 3.3 | 280 | 10 |
| 15 | 1 | 2.6 | — | 0.15 | 3.3 | 280 | 10 |
| 16 | 1 | 3.4 | — | 0.15 | 3.3 | 280 | 10 |
| 17 | 1 | 0.1 | — | 0.15 | 0.4 | 280 | 10 |
| 18 | 1 | 0.2 | — | 0.15 | 0.4 | 280 | 10 |
| 19 | 1 | 0.3 | — | 0.15 | 0.4 | 280 | 10 |

Next, Table 5 shows the covering layer makeup with respect to the respective test pieces as obtained. The average thickness of the Cu—Sn alloy covering layer, Cu content thereof, the ratio of the exposed area of the Cu—Sn alloy covering layer, and the average thickness of the Sn covering layer were measured by the same procedures as those previously described with reference to Embodiment 1. Further, every exposure interval between the portions of the Cu—Sn alloy covering layer, exposed to the uppermost surface, was found in the preferable range previously described (the range of 0.01 to 0.5 mm).

TABLE 5

| Test Piece No. | Cu—Sn Alloy Covering Layer: Thickness (μm) | Cu—Sn Alloy Covering Layer: Cu content (at. %) | Cu—Sn Alloy Covering Layer: Exposed area ratio (%) | Sn Covering Layer Average Thickness (μm) | Friction Coefficient | Contact Resistance after being left out at high temperature (mΩ) | Contact Resistance after salt spray test (mΩ) |
|---|---|---|---|---|---|---|---|
| 11 | 0.3 | 55 | 10 | 0.5 | 0.32 | 25 | 15 |
| 12 | 0.3 | 55 | 30 | 0.5 | 0.25 | 40 | 20 |
| 13 | 0.3 | 55 | 50 | 0.5 | 0.25 | 75 | 35 |
| 14 | 0.3 | 55 | 10 | 3.0 | 0.35 | 5 | 3 |
| 15 | 0.3 | 55 | 30 | 3.0 | 0.31 | 10 | 5 |
| 16 | 0.3 | 55 | 50 | 3.0 | 0.29 | 20 | 8 |
| 17 | 0.3 | 55 | 10 | 0.1 | 0.30 | 120 | 130 |
| 18 | 0.3 | 55 | 30 | 0.1 | 0.26 | 250 | 180 |
| 19 | 0.3 | 55 | 50 | 0.1 | 0.24 | 450 | 220 |

Further, the respective test pieces as obtained were subjected to the friction coefficient evaluation test, evaluation test for contact resistance after being left out at high temperature, and evaluation test for contact resistance after the salt spray test, respectively, conducted by the same procedures as those described with reference to Embodiment 1. Results of the those tests are also shown in Table 5.

As shown in Table 5, the test pieces Nos. 11 to 16, respectively, meet requirements for the covering layer makeup, as specified in the invention, and were found low in friction coefficient, exhibiting excellent properties in respect of either the contact resistance after those are left out at high temperature for many hours, or the contact resistance after the salt spray test.

On the other hand, as to the test pieces Nos. 17 to 19, respectively, the average thickness of the Sn covering layer thereof was found small, so that the contact resistances was found high. Further, as to the test pieces Nos. 18, 19, respectively, the reason for the above is because the average thickness of the Sn covering layer was small in comparison with magnitude of the arithmetic mean roughness Ra of the surface of the base material, so that it is possible to obtain the covering layer makeup meeting the requirements of the invention if the average thickness of the Sn covering layer thereof is increased. However, as to the test piece No. 17, since the arithmetic mean roughness Ra of the surface of the base material was too small, it will be difficult to obtain the covering layer makeup meeting the requirements of the invention even if the average thickness of the Sn covering layer thereof is increased.

EMBODIMENT 3

With respective test pieces, Cu plating was applied to a thickness of 0.15 μm to a base material made of the Cu-alloy No. 1, with the surface roughening treatment applied thereto, and further, Sn plating was applied thereto to respective thicknesses before the reflow process at 280° C. was applied for 10 seconds, thereby having obtained the test pieces (Nos. 20 to 25). Table 6 shows respective conditions under which the test pieces were fabricated. Among parameters for the surface roughness of the base material, the average interval Sm between the projections and depressions was found in the preferable range as previously described (the range of 0.1 to 0.5 mm) with respect to all the test pieces. Further, the average thickness of the Cu plating layer, and that of the Sn plating layer, shown in Table 6, were measured by the same procedures as those described with reference to Embodiment 1.

TABLE 6

| Test Piece No. | Base Material: Alloy No. | Base Material: Arithmetic Mean Roughness Ra (μm) | Ni plating Average Thickness (μm) | Cu Plating Average Thickness (μm) | Sn Plating Average Thickness (μm) | Reflow Process: Temperature (° C.) | Reflow Process: Time (s) |
|---|---|---|---|---|---|---|---|
| 20 | 1 | 0.8 | — | 0.15 | 0.9 | 280 | 5 |
| 21 | 1 | 0.8 | — | 0.15 | 1.7 | 280 | 25 |
| 22 | 1 | 0.8 | — | 0.15 | 1.0 | 250 | 15 |
| 23 | 1 | 0.8 | — | 0.15 | 1.0 | 350 | 5 |
| 24 | 1 | 0.8 | — | 0.15 | 0.75 | 280 | 1 |
| 25 | 1 | 0.8 | — | 0.15 | 0.8 | 230 | 50 |
| 26 | 1 | 0.8 | — | 0.15 | 1.3 | 800 | 10 |

Next, Table 7 shows the covering layer makeup with respect to the respective test pieces as obtained. The average thickness of the Cu—Sn alloy covering layer, Cu content thereof, the ratio of the exposed area of the Cu—Sn alloy covering layer, and the average thickness of the Sn covering layer were measured by the same procedures as those previously described with reference to Embodiment 1. Further, every exposure interval between the portions of the Cu—Sn alloy covering layer, exposed to the uppermost surfaces was found in the preferable range previously described (the range of 0.01 to 0.5 mm).

TABLE 7

| | Cu—Sn Alloy Covering Layer | | | Sn Covering | | Contact Resistance after being | Contact |
|---|---|---|---|---|---|---|---|
| Test Piece No. | Average Thickness (μm) | Cu content (at. %) | Exposed area ratio (%) | Layer Average Thickness (μm) | Friction Coefficient | left out at high temperature (mΩ) | Resistance after salt spray test (mΩ) |
| 20 | 0.2 | 55 | 30 | 0.7 | 0.26 | 50 | 40 |
| 21 | 1.0 | 55 | 30 | 0.7 | 0.25 | 20 | 10 |
| 22 | 0.3 | 45 | 30 | 0.7 | 0.32 | 30 | 15 |
| 23 | 0.3 | 65 | 30 | 0.7 | 0.24 | 60 | 50 |
| 24 | 0.05 | 55 | 30 | 0.7 | 0.27 | 260 | 190 |
| 25 | 0.1 | 15 | 30 | 0.7 | 0.47 | 195 | 150 |
| 26 | 0.6 | 75 | 30 | 0.7 | 0.24 | 170 | 140 |

Further, the respective test pieces as obtained were subjected to the friction coefficient evaluation test, evaluation test or contact resistance after left out at high temperature, and evaluation test for contact resistance after the salt spray test, respectively, conducted by the same procedures as those described with reference to Embodiment 1. Results of the respective tests are also shown in Table 7.

As shown in Table 7, the test pieces Nos. 20 to 23 meet requirements for the covering layer makeup, as specified in the invention, and were found low in friction coefficient exhibiting excellent properties in respect of either the contact resistance after those are left out at high temperature or many hours, or the contact resistance after the salt spray test.

Meanwhile, in the case of the test piece No. 24, because time for the reflow process was too short, a Cu—Sn alloy covering layer was insufficiently formed to be lacking in average thickness, so that the contact resistances were found high. In the case of the test piece No. 25, because the reflow process temperature was too low, the Cu content of the Cu—Sn alloy covering layer decreased, resulting in higher friction coefficient. Further, since time for the reflow process was lengthened, the contact resistances increased. In the case of the test piece No. 26, the reflow process temperature was too high, and the Cu content of the Cu—Sn alloy covering layer became excessively high, resulting in an increase in the contact resistances.

EMBODIMENT 4

With respective test pieces, Ni plating and Cu plating were applied to a thickness 0.3 μm, and a thickness 0.15 μm respectively, to Cu-alloy base materials thereof, made of the Cu-alloys No. 1, 2, respectively, with the surface roughening treatment applied thereto, (except for the test pieces Nos. 33, 34), respectively, and further, Sn plating was applied to a thickness 1.0 μm thereto before applying the reflow process at 280° C. for 10 seconds, thereby having obtained the test pieces (Nos. 27 to 36) Table 8 shows respective conditions under which those test pieces were fabricated. Among parameters for the surface roughness of the base material, the average interval Sm between the projections and depressions was found in the preferable range as previously described (the range of 0.01 to 0.5 mm) with respect to all the test pieces. Further, the average thickness of an NI plating layer, and that of an Sn plating layer, shown in Table 8, were measured by respective procedures described hereunder while the average thickness of a Cu plating layer was by the same procedures as that described with reference to Embodiment 1.

[Method for Measuring the Average Thickness of the Ni Plating Layer, and the Average Thickness of the Sn Plating Layer]

With the respective test pieces before the reflow process, the average thickness of the Ni plating layer and that of the Sn plating layer were worked out, respectively, with the use of the fluorescent X-ray coating thickness gauge (SFT3200 manufactured by Seiko instruments Inc.). Measurement was taken on condition that dual-layer analytical curves of Sn/Ni/the base material were used for the analytical curves, and the collimator diameter was ϕ 0.5 m.

TABLE 8

| Test Piece No. | Base Material Alloy No. | Base Material Arithmetic Mean Roughness Ra (μm) | Ni plating Average Thickness (μm) | Cu Plating Average Thickness (μm) | Sn Plating Average Thickness (μm) | Reflow Process Temperature (° C.) | Reflow Process Time (s) |
|---|---|---|---|---|---|---|---|
| 27 | 1 | 0.4 | 0.3 | 0.15 | 1.0 | 280 | 10 |
| 28 | 2 | 0.4 | 0.3 | 0.15 | 1.0 | 280 | 10 |
| 29 | 1 | 0.8 | 0.3 | 0.15 | 1.0 | 280 | 10 |
| 30 | 2 | 0.8 | 0.3 | 0.15 | 1.0 | 280 | 10 |
| 31 | 1 | 1.3 | 0.3 | 0.15 | 1.0 | 280 | 10 |
| 32 | 2 | 1.3 | 0.3 | 0.15 | 1.0 | 280 | 10 |
| 33 | 1 | 0.05 | 0.3 | 0.15 | 1.0 | 280 | 10 |
| 34 | 2 | 0.05 | 0.3 | 0.15 | 1.0 | 280 | 10 |
| 35 | 1 | 2.2 | 0.3 | 0.15 | 1.0 | 280 | 10 |
| 36 | 2 | 2.2 | 0.3 | 0.15 | 1.0 | 280 | 10 |

Next, Table 9 shows the covering layer makeup with respect to the respective test pieces as obtained. The average thickness of the Cu—Sn alloy covering layer, and the average thickness of the Sn covering layer were measured by respective procedures described hereunder. The Cu content of the Cu—Sn alloy covering layer, and the ratio of the exposed area of the Cu—Sn alloy covering layer were measured by the same procedures as those previously described with reference to Embodiment 1. Further, every exposure interval between the portions of the Cu—Sn alloy covering layer, exposed to the uppermost surface, was found in the preferable range previously described (the range of 0.1 to 0.5 mm).

[Method for Measuring the Average Thickness of the Cu—Sn Alloy Covering Layer]

First, the test pieces each were immersed in an aqueous solution of p-nitrophenol, and sodium hydroxide for 10 minutes to thereby remove the Sn covering layer. Thereafter, measurement was taken on a film-thickness of Sn content of the Cu—Sn alloy covering layer with the use of the fluorescent X-ray coating thickness gauge (SFT3200 manufactured by Seiko Instruments Inc.) Measurement was taken on the condition that the dual-layer analytical curves of Sn/Ni/the base material were used for the analytical curves, and the collimator diameter was ϕ 0.5 mm. The average thickness of the Cu—Sn alloy covering layer was worked out by defining a value thus obtained as the average thickness.

[Method for Measuring the Average Thickness of the Sn Covering Layer]

With the respective test pieces, measurement was first taken on the sum of a film thickness of the Sn covering layer and a film thickness of an Sn component of the Cu—Sn alloy covering layer with the use of the fluorescent X-ray coating thickness gauge (SFT3200 manufactured by Seiko Instruments Inc.). Thereafter, the test pieces each were immersed in an aqueous solution of p-nitrophenol, and sodium hydroxide for 10 minutes to thereby remove the Sn covering layer. The film thickness of the Sn component of the Cu—Sn alloy covering layer was measured again with the use of the fluorescent X-ray coating thickness gauge. Measurement was taken on the condition that the dual-layer analytical curves of Sn/Ni/the base material were used for the analytical curves, and the collimator diameter was ϕ 5 mm. The average thickness of the Sn covering layer was computed by subtracting the film thickness of the Sn component of the Cu—Sn alloy covering layer from the sum of the film thickness of the Sn covering layer, and the film thickness of the Sn component of the Cu—Sn alloy covering layers obtained as above.

TABLE 9

| Test Piece No. | Cu—Sn Alloy Covering Layer Average Thickness (μm) | Cu—Sn Alloy Covering Layer Cu content (at. %) | Cu—Sn Alloy Covering Layer Exposed area ratio (%) | Sn Covering Layer Average Thickness (μm) | Friction Coefficient | Contact Resistance after being left out at high temperature (mΩ) | Contact Resistance after salt spray test (mΩ) |
|---|---|---|---|---|---|---|---|
| 27 | 0.3 | 55 | 10 | 0.7 | 0.32 | 2 | 4 |
| 28 | 0.3 | 55 | 10 | 0.7 | 0.33 | 2 | 3 |
| 29 | 0.3 | 55 | 30 | 0.7 | 0.25 | 3 | 8 |
| 30 | 0.3 | 55 | 30 | 0.7 | 0.25 | 4 | 10 |
| 31 | 0.3 | 55 | 50 | 0.7 | 0.24 | 5 | 13 |
| 32 | 0.3 | 55 | 50 | 0.7 | 0.23 | 7 | 18 |
| 33 | 0.3 | 55 | 0 | 0.7 | 0.53 | 1 | 1 |
| 34 | 0.3 | 55 | 0 | 0.7 | 0.52 | 1 | 1 |
| 35 | 0.3 | 55 | 80 | 0.7 | 0.24 | 13 | 110 |
| 36 | 0.3 | 55 | 80 | 0.7 | 0.24 | 25 | 120 |

Further, the respective test pieces shown in Table 9 were subjected to the friction coefficient evaluation test, evaluation test for contact resistance after left out at high temperature, and evaluation test for contact resistance after the salt spray test, respectively, conducted by the same procedures as those described with reference to Embodiment 1. Results of the respective tests are also shown in Table 9

As shown in Table 9, the test pieces Nos. 27 to 32 meet requirements for the covering layer makeup, as specified in the invention, and were found low in friction coefficient, exhibiting excellent properties in respect of either the contact resistance after those are left out at high temperature for many hours or the contact resistance after the salt spray test. Further, because an Ni covering layer was formed those test pieces were found low particularly in the contact resistance after left out at high temperature, in comparison with the test pieces Nos. 1 to 6, and so forth.

Meanwhile, since the Ni covering layer was formed, the test pieces Nos. 33 to 36 were also found low particularly in the contact resistance after left out at high temperature, in comparison with the test pieces Nos. 7 to 10, and so forth.

With the test pieces Nos. 33, 34, however, because the surface of a base material was smooth, the ratio of the exposed area of the Cu—Sn alloy covering layer was found at 0%, resulting in large frictional resistance. In the case of the test pieces Nos. 35, 36, the average thickness of the Sn plating layer was small in comparison with a relatively large arithmetic mean roughness Ra of the surface of the base material, so that the ratio of the exposed area of the Cu—Sn alloy covering layer became excessively large, resulting in an increase, particularly, in the contact resistance after the salt spray test. With the test pieces Nos. 35, 36, it is possible to obtain the covering layer makeup meeting the requirements of the invention the average thickness of the Sn plating layer is increased.

EMBODIMENT 5

[Fabrication of Cu-Alloy Base Materials]

With the present embodiment, a Cu-alloy strip, comprising Cu containing 0.1 mass % Fe, 0.03 mass % P, and 2.0 mass % Sn, was used, and was subjected to surface roughening treatment by a mechanical method (rolling or polishing) to be thereby finished into Cu-alloy base materials 180 in Vickers hardness, and 0.25 mm in thickness, with predetermined surface roughness, respectively. Further, Ni plating, Cu plating, and Sn plating were applied thereto to respective thicknesses, and the reflow process at 280° C. was applied for 10 seconds, thereby having obtained the test pieces Nos. 37 to 41. Table 10 shows respective conditions under which those test pieces were fabricated. The surface roughness of the base material, and the average thickness of the Cu plating layer, shown in Table 10, were measured by the same procedures as those described with reference to Embodiment 1. The average thickness of an Ni plating layer was measured by the same procedures as that described with reference to Embodiment 4, and the average thickness of an Sn plating layer was measured by a procedures described hereunder.

[Method for Measuring the Average Thickness of the Sn Plating Layer]

The average thickness of the Sn plating layer of each of the test pieces before the reflow process was worked out with the use of the fluorescent X-ray coating thickness gauge (SFT3200 manufactured by Seiko Instruments Inc). Measurement was taken on a condition that the single-layer analytical curves of Sn/the base material, or the dual-layer analytical curves of Sn/Ni/the base material were used for the analytical curves, and the collimator diameter was φ 0.5 mm.

TABLE 10

| Test Piece No. | Base Material: Arithmetic Mean Roughness Ra (μm) | Base Material: Average Interval Between Projections and Depressions (mm) | Ni Plating Average Thickness (μm) | Cu Plating Average Thickness (μm) | Sn plating Average Thickness (μm) | Reflow Process: Temperature (° C.) | Reflow Process: Time (s) |
|---|---|---|---|---|---|---|---|
| 37 | 0.62 | 0.08 | 0.3 | 0.15 | 1.0 | 280 | 10 |
| 38 | 0.68 | 0.14 | — | 0.15 | 1.0 | 280 | 10 |
| 39 | 0.94 | 0.62 | — | 0.15 | 1.5 | 280 | 10 |
| 40 | 0.28 | 0.11 | 0.3 | 0.15 | 0.6 | 280 | 10 |
| 41 | 0.11 | 0.04 | — | 0.15 | 1.0 | 280 | 10 |

Figure 6:
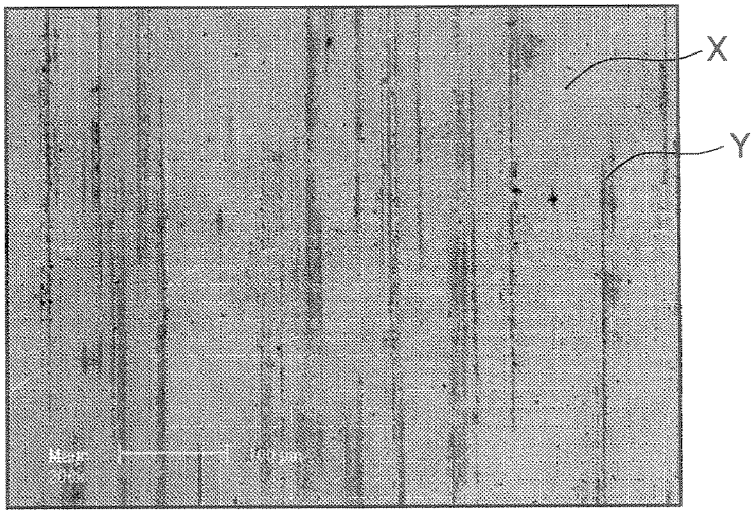
FIG. 6 shows a composition image of a test piece No. 37, taken by the scanning electron microscope, showing the uppermost structure thereof.
Figure 7:
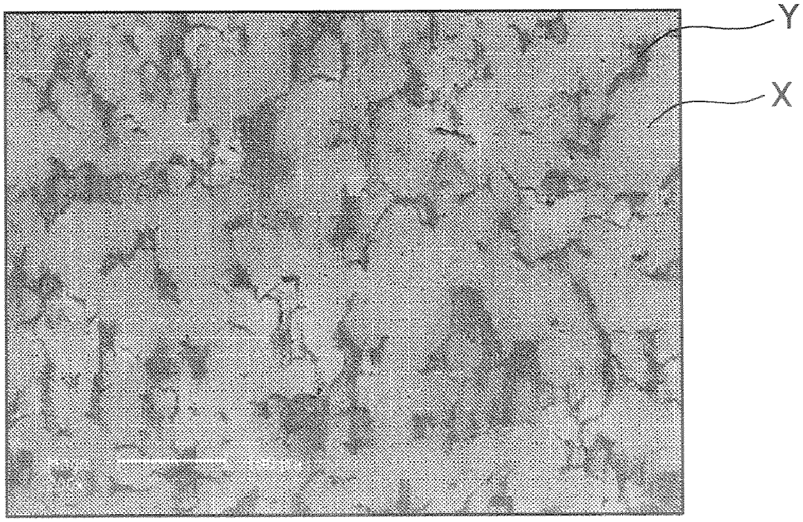
FIG. 7 shows a composition image of the test piece No. 38, taken by the scanning electron microscope, showing the uppermost structure thereof.

Next, with respect to the respective test pieces as obtained, the covering layer makeup, and the surface roughness of the material are shown in Table 11. Further, the Cu content of a Cu—Sn alloy covering layer, the ratio of the exposed area of the Cu—Sn alloy covering layer to the surface of the material, and the average material surface exposure interval of the Cu—Sn alloy covering layer were measured by the same procedures as those previously described with reference to Embodiment 1 while the average thickness of the Cu—Sn alloy covering layer, the average thickness of the Sn covering layer, a thickness of an portion of the Cu—Sn alloy covering layer, exposed to the surface of the material, and the surface roughness of the material were measured by respective procedures described hereunder. FIG. 6 shows a composition image of the test piece No. 37, and FIG. 7 shows a composition image of the test piece No. 38. In the figures, reference numeral X denotes the Sn covering layer, and Y an exposed portion of the Cu—Sn alloy covering layer. The test piece No. 37 was subjected to the surface roughening treatment by polishing, and the test piece No. 38 was subjected to the surface roughening treatment by rolling.

[Method for Measuring the Average Thickness of the Cu—Sn Alloy Covering Layer]

First, the test pieces each were immersed in an aqueous solution of p-nitrophenol, and sodium hydroxide for 10 minutes to thereby remove the Sn covering layer. Thereafter, measurement was taken on a film-thickness of Sn content of the Cu—Sn alloy covering layer with the use of the fluorescent X-ray coating thickness gauge (SFT3200 manufactured by Seiko Instruments Inc.). Measurement was taken on the condition that the single-layer analytical curves of Sn/the base material, or the dual-layer analytical curves of Sn/Ni/the base material were used for the analytical curves, and the collimator diameter was ϕ 0.5 mm. The average thickness of the Cu—Sn alloy covering layer was worked out by defining a value thus obtained as the average thickness.

[Method for Measuring the Average Thickness of the Sn Covering Layer]

With the respective test pieces, measurement was first taken on the sum of a film thickness of the Sn covering layer and a film thickness of an Sn component of the Cu—Sn alloy covering layer with the use of the fluorescent X-ray coating thickness gauge (SFT3200 manufactured by Seiko Instruments Inc.). Thereafter, the test pieces each were immersed in an aqueous solution of p-nitrophenol, and sodium hydroxide for 10 minutes to thereby remove the Sn covering layer. The film thickness of the Sn component of the Cu—Sn alloy covering layer was measured again with the use of the fluorescent X-ray coating thickness gauge. Measurement was taken on the condition that the single-layer analytical curves of Sn/the base material, or the dual-layer analytical curves of Sn/Ni/the base material were used for the analytical curves, and the collimator diameter was ϕ 0.5 mm. The average thickness of the Sn covering layer was computed by subtracting the film thickness of the Sn component of the Cu—Sn alloy covering layer from the sum of the film thickness of the Sn covering layer, and the film thickness of the Sn component of the Cu—Sn alloy covering layer, obtained as above.

[Method for Measuring the Thickness of the Portion of the Cu—Sn Alloy Covering Layer, Exposed to the Surface of the Material]

A section of each of the test pieces, prepared by microtomy, was observed at 10,000× magnification with the use of the SEM (the scanning electron microscope) to thereby work out the average thickness of the portion of the Cu—Sn alloy covering layer, exposed to the surface of the material, by use of an image analysis process.

[Method for Measuring Surface Roughness of the Material]

The surface roughness of the material was measured on the basis of JIS B0601-1994 by use of the contact type surface-roughness tester (Surfcom 1400 model manufactured by Tokyo Seimitsu Co., Ltd.). The surface roughness was measured on the condition of the cutoff value at 0.8 mm, the reference length 0.8 mm, the evaluation length 4.0 mm, the measuring rate at 0.3 mm/s, and the stylus tip radius at 5 μm R. Further, the direction (the direction in which the surface roughness is exhibited at its maximum) orthogonal to the direction in which rolling or polishing was carried out at the time of the surface roughening treatment was adopted for the surface-roughness measuring direction.

TABLE 11

| Test Piece No. | Cu—Sn Alloy Covering Layer: Cu content (at. %) | Cu—Sn Alloy Covering Layer: Average Thickness (μm) | Sn Covering Layer: Average Thickness (μm) | Portion of Cu—Sn Alloy Covering Layer Exposed to the Surface: Exposed Area Ratio (%) | Portion of Cu—Sn Alloy Covering Layer Exposed to the Surface: Average Material Surface Exposure Interval (mm) | Portion of Cu—Sn Alloy Covering Layer Exposed to the Surface: Thickness of Exposed Portion (μm) | Surface of Material Arithmetic Mean Roughnes: Ra (μm) |
|---|---|---|---|---|---|---|---|
| 37 | 55 | 0.3 | 0.7 | 18 | 0.11 | 0.35 | 0.38 |
| 38 | 58 | 0.45 | 0.55 | 29 | 0.16 | 0.45 | 0.44 |
| 39 | 58 | 0.5 | 1.0 | 26 | 0.71 | 0.5 | 0.36 |
| 40 | 55 | 0.3 | 0.3 | 24 | 0.13 | 0.35 | 0.12 |
| 41 | 55 | 0.45 | 0.55 | 0 | — | — | 0.06 |

Further, the respective test pieces as obtained were subjected to the evaluation test for contact resistance after left out at high temperature, and the evaluation test for contact resistance after the salt spray tests respectively, conducted by the same procedures as those described with reference to Embodiment 1 while the friction coefficient evaluation test, and an evaluation test for contact resistance at the time of slight sliding were conducted by procedures described hereunder. Results of the respective tests are shown in Table 12.

[Friction Coefficient Evaluation Test]

Evaluation was made by simulating the shape of an indent of an electrical contact in a fitting type connecting part with the use of the apparatus as shown in FIG. 5. First, a male specimen 1 prepared from a sheet material cut out from the respective test pieces was fixedly attached to the horizontal platform 2, and on the top of the male specimen 1, a female specimen 3 prepared from a hemisphere-shaped workpiece (ϕ 1.5 mm in inside diameter) cut out from the test piece No. 41 was placed, thereby having brought respective covering layers of both the specimens into contact with each other. Subsequently, the load (weight 4) of 3.0 N was imposed on the female specimen 3 to press down the male specimen 1, and the male specimen 1 was pulled in the horizontal direction (sliding rate at 80 mm/min) with the use of the horizontal-load measuring apparatus (model-2152 manufactured by Aiko Engineering Co. Ltd.), thereby having measured a maximum friction force F (unit: N) up to the sildable distance 5 mm. Friction coefficient was found by the expression (1) previously described.

[Evaluation Test for Contact Resistance at the Time of Slight Sliding]

Figure 8:
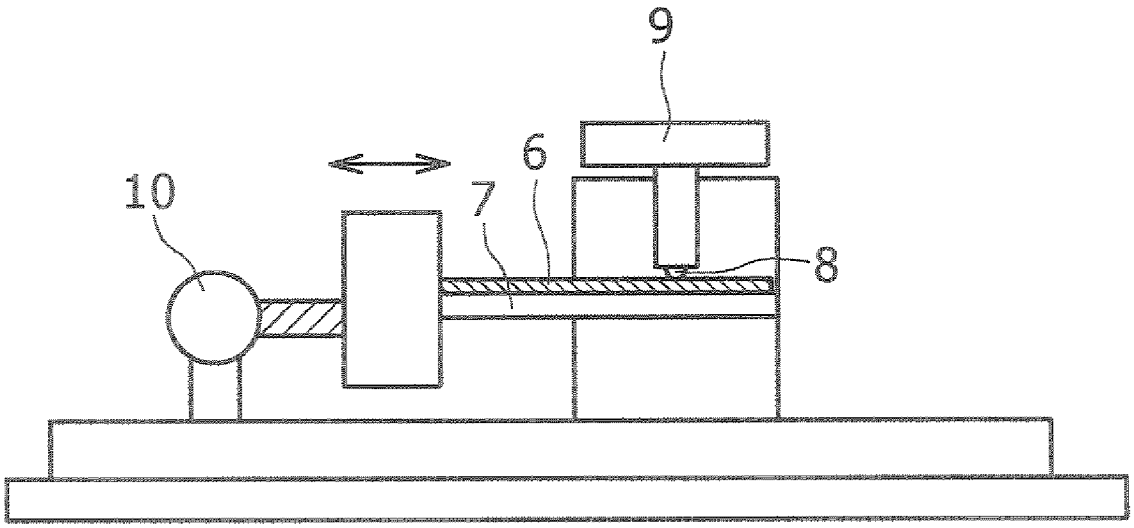
FIG. 8 is a conceptual view of a jig for measuring wear due to the slight-sliding.

Evaluation was made by simulating the shape of the indent of the electrical contact in the fitting type connecting part with the use of a slidable tester (CRS-B1050CHO: model manufactured by K. K. Yamazaki Seiki Laboratory) as shown in FIG. 8. First, a male specimen 6 prepared from a sheet material cut out from the test piece 41 was fixedly attached to a horizontal platform 7, and on the top of the male specimen 6, a female specimen 8 prepared from a hemisphere-shaped workpiece (ϕ 1.5 mm in inside diameter) cut out from the respective test pieces was placed, thereby having brought respective covering layers of both the specimens into contact with each other. Subsequently, a load (weight 9) of 2.0 N was imposed on the female specimen 8 to press down the male specimen 6, and a constant current was applied between the male specimen 6 and the female specimen 8, thereby having caused the male specimen 6 to slidably move in the horizontal direction (a sliding distance: 50 μm, sliding frequency: 1 Hz), thereby having measured the maximum contact resistance up to 1000 in sliding frequency by the four-terminal method under the condition of an open voltage 20 mV, and current 10 mA. In the figure, arrows denote respective slidable directions.

TABLE 12

| Test Piece No. | Friction Coefficient | Contact Resistance after being left out at high temperature (mΩ) | Contact Resistance after salt spray test (mΩ) | Contact Resistance upon slight sliding (mΩ) |
|---|---|---|---|---|
| 37 | 0.24 | 4 | 7 | 19 |
| 38 | 0.23 | 21 | 11 | 12 |
| 39 | 0.46 | 23 | 18 | 76 |
| 40 | 0.31 | 7 | 12 | 179 |
| 41 | 0.54 | 18 | 4 | 184 |

As shown in Tables 10 to 12, the test pieces Nos. 37, 38 meet requirements for the covering layer makeup, as specified in the invention, and are found very low in friction coefficient, exhibiting excellent properties in respect of any of the contact resistance after being left out at high temperature for many hours, the contact resistance after the salt spray test, and the contact resistance at the time of slight sliding. In the case of the test piece No. 37 with the Ni covering layer formed therein, in particular, the contact resistance after being left out at high temperature is found particularly low, showing that the test piece No. 37 is excellent in heat resistance.

Meanwhile, in the case of the test piece No. 39, the average exposure interval between the respective portions of the Cu—Sn alloy covering layer, exposed to the surface of the material, is wider, so that an advantageous effect of the invention in reducing friction coefficient, at small contacts, was less, and the contact resistance at the time of slight sliding could not be controlled to a sufficiently low level. Further, in the case of the test piece No. 40, because the arithmetic mean roughness Ra was small, the contact resistance at the time of slight sliding could not be controlled to a low level. Further, in the case of the test piece No. 41, since uses was made of a common base material without the surface roughening treatment applied thereto, portions of the Cu—Sn alloy covering layer were not exposed to the surface of the material, resulting in high friction coefficient, and high contact resistance at the time of slight Siding.

EMBODIMENT 6

[Fabrication of Cu-Alloy Base Materials]

With the present embodiment, use was made of a 7/3 brass strip, which was subjected to the surface roughening treatment by the mechanical method (rolling or polishing) to be thereby finished into Cu-alloy base materials with predetermined surface roughness respectively, 170 in Vickers hardness, and 0.25 mm in thickness. Further, Ni plating, and Cu plating were applied thereto to respective thicknesses, and Sn plating was applied thereto to a predetermined thickness, and subsequently, respective reflow processes were applied thereto, thereby having obtained test pieces Nos. 42 to 46. Table 13 shows respective conditions under which those test pieces were fabricated. The surface roughness of the respective base materials, and the average thickness of a Cu plating layer, shown in Table 13, were measured by the same procedures as that described with reference to Embodiment 1. The average thickness of an Ni plating layer was measured by the same procedure as that described with reference to Embodiment 4, and the average thickness of an Sn plating layer was measured by the same procedure as that described with reference to Embodiment 5.

TABLE 13

| Test Piece No. | Cu-Alloy Base Material: Arithmetic Mean Roughness Ra (μm) | Cu-Alloy Base Material: Average Interval Between Projections and Depressions (mm) | Ni Plating Average Thickness (μm) | Cu Plating Average Thickness (μm) | Sn plating Average Thickness (μm) | Reflow Process: Temperature (° C.) | Reflow Process: Time (s) |
|---|---|---|---|---|---|---|---|
| 42 | 2.85 | 0.26 | — | 0.65 | 2.5 | 280 | 10 |
| 43 | 2.85 | 0.26 | — | 0.65 | 2.5 | 560 | 2 |
| 44 | 2.85 | 0.26 | 0.3 | 0.15 | 2.5 | 235 | 10 |
| 45 | 2.85 | 0.26 | — | 0.65 | 2.5 | 750 | 10 |
| 46 | 2.85 | 0.26 | — | 0.65 | 2.5 | 280 | 300 |

Next, with respect to the respective test pieces as obtained, the covering layer makeup, and the surface roughness of the material are shown in Table 14. Further, the Cu content of a Cu—Sn alloy covering layer, a ratio of the exposed area of the Cu—Sn alloy covering layer to the surface of the material, and an average material surface exposure interval of the Cu—Sn alloy covering layer were measured by the same procedures as those previously described with reference to Embodiment 1 while the average thickness of the Cu—Sn alloy covering layer, the average thickness of the Sn covering layer, a thickness of the portion of the Cu—Sn alloy covering layer, exposed to the surface of the material, and the surface roughness of the material were measured by the same procedures as those previously described with reference to Embodiment 5.

TABLE 14

| Test Piece No. | Cu—Sn Alloy Covering Layer: Cu content (at. %) | Cu—Sn Alloy Covering Layer: Average Thickness (μm) | Sn Covering Layer: Average Thickness (μm) | Portion of Cu—Sn Alloy Covering Layer Exposed to the Surface: Exposed Area Ratio (%) | Portion of Cu—Sn Alloy Covering Layer Exposed to the Surface: Average Material Surface Exposure Interval (mm) | Portion of Cu—Sn Alloy Covering Layer Exposed to the Surface: Thickness of Exposed Portion (μm) | Surface of Material Arithmetic Mean Roughnes: Ra (μm) |
|---|---|---|---|---|---|---|---|
| 42 | 55 | 0.5 | 2.0 | 48 | 0.29 | 0.55 | 1.21 |
| 43 | 67 | 0.35 | 2.15 | 26 | 0.33 | 0.05 | 1.47 |
| 44 | 18 | 0.3 | 2.2 | 12 | 0.48 | 0.3 | 2.11 |
| 45 | 75 | 0.95 | 1.55 | 62 | 0.27 | 0.4 | 1.78 |
| 46 | 63 | 2.45 | 0.05 | 91 | 0.27 | 1.6 | 2.62 |

-

Further, the respective test pieces as obtained were subjected to the evaluation test for contact resistance after being left out at high temperature, and the evaluation test for contact resistance after the salt spray test, respectively, conducted by the same procedures as those described with reference to Embodiment 1 while the friction coefficient evaluation test, and the evaluation test for contact resistance at the time of slight sliding were conducted by the same procedures as those described with reference to Embodiment 5. Results of the respective tests are shown in Table 15.

TABLE 15

| Test Piece No. | Friction Coefficient | Contact Resistance after being left out at high temperature (mΩ) | Contact Resistance after salt spray test (mΩ) | Contact Resistance upon slight sliding (mΩ) |
|---|---|---|---|---|
| 42 | 0.21 | 34 | 19 | 8 |
| 43 | 0.25 | 212 | 154 | 46 |
| 44 | 0.47 | 8 | 6 | 236 |
| 45 | 0.24 | 149 | 102 | 28 |
| 46 | 0.38 | 117 | 228 | 896 |

As shown in Tables 13 to 15, the test piece No. 42 meets requirements for the covering layer makeup, as specified in the invention, and is found very low in friction coefficient, exhibiting excellent properties in respect of any of the contact resistance after being left out at high temperature for many hours, the contact resistance after the salt spray test, and the contact resistance at the time of slight sliding.

Meanwhile, in the case of the test piece No. 43, which is the test piece to which the reflow process at a high temperature was applied for a short time, a thickness of the portion of the Cu—Sn alloy covering layer, exposed to the surface of the material was found small, so that both the contact resistance after being left out at high temperature for many hours, and the contact resistance after the salt spray test were found high. Further, in the case of the test piece No. 44, since the reflow temperature was low, the Cu content of the Cu—Sn alloy covering layer was less, so that an advantageous effect of the invention in reducing the friction coefficient was small, and the contact resistance at the time of slight sliding was found high. The test piece No. 45 was subjected to the reflow process at an excessively high temperature to the contrary so that the Cu content of the Cu—Sn alloy covering layer became high, and both the contact resistance after being left out at high temperature for many hours, and the contact resistance after the salt spray test were found high. Still further, in the case of test piece No. 46, a reflow time length was very long, so that the thickness of the Sn covering layer became small, the ratio of the exposed area of the Cu—Sn alloy covering layer to the surface of the material became high, and an oxidized Sn film layer was formed to a large thickness during the reflow process, resulting in an increase in any of the contact resistance after being left out at high temperature for many hours, the contact resistance after the salt spray test, and the contact resistance at the time of slight sliding.

INDUSTRIAL APPLICABILITY

The invention is useful in application to a conductive material for connecting parts such as a connector terminal, bus bar, and so forth, used in electrical wiring mainly for automobiles, consumer equipment, and the like.

The invention claimed is:

1. A conductive material for a connecting part, comprising:

a base material made up of a Cu strip;

a Cu—Sn alloy covering layer formed over a surface of the base material, containing Cu in a range of 20 to 70 at. %, and having an average thickness in a range of 0.1 to 3.0 μm; and an Sn covering layer formed over the Cu—Sn alloy covering layer in such a manner that portions of the Cu—Sn alloy covering layer are exposed, the Sn covering layer having an average thickness in a range of 0.2 to 5.0 μm, wherein a ratio of an exposed area of the Cu—Sn alloy covering layer to a surface of the conductive material is in a range of 3 to 75%.

2. A conductive material for a connecting parts according to claim 1, wherein the Sn covering layer is smoothed by a reflow process.

3. A conductive material for a connecting part, according to claim 1, wherein an arithmetic mean roughness Ra of a surface of the base material, in at least one direction, is not less than 0.15 μm, and the arithmetic mean roughness Ra thereof, in all directions, is not more than 4.0 μm.

4. A conductive material for a connecting part, according to claim 1, wherein an average interval between projections and depressions on a surface of the base material, in at least one direction, is in a range of 0.01 to 0.5 mm.

5. A conductive material for a connecting part, according to claim 1, wherein an average material surface exposure interval between portions of the Cu—Sn alloy covering layer, exposed to the surface of the conductive material, in at least one direction, is in a range of 0.01 to 0.5 mm.

6. A conductive material for a connecting part, according to claim 1, further comprising a Cu covering layer formed between the surface of the base material, and the Cu—Sn alloy covering layer.

7. A conductive material for a connecting part, according to claim 1, further comprising an Ni covering layer formed between the surface of the base material, and the Cu—Sn alloy covering layer.

8. A conductive material for a connecting part, according to claim 7, further comprising a Cu covering layer formed between the Ni covering layer, and the Cu—Sn alloy covering layer.

9. A conductive material for a connecting part, comprising:

a base material made up of a Cu strip;

a Cu—Sn allots covering layer formed over a surface of the base material, containing Cu in a range of 20 to 70 at. %, and having an average thickness in a range of 0.2 to 3.0 μm; and an Sn covering layer formed over the Cu—Sn alloy covering layer in such a manner that portions of the Cu—Sn alloy covering layer are exposed, the Sn covering layer having an average thickness in a range of 0.2 to 5.0 μm, wherein a ratio of an exposed area of the Cu—Sn alloy covering layer to a surface of the conductive material is in a range of 3 to 75%, the surface of the conductive material is subjected to a reflow process and an arithmetic mean roughness Ra of the surface of the material, in at least one direction, is not less than 0.15 μm, and the arithmetic mean roughness Ra thereof, in all directions, is not more than 3.0 μm.

10. A conductive material for a connecting part, according to claim 9, wherein a thickness of a portion of the Cu—Sn alloy covering layer, exposed to the surface of the Sn covering layer, is in a range of 0.3 to 1.0 μm.

11. A conductive material for a concerning part, according to claim 9, wherein an arithmetic mean roughness Ra of a surface of the base material, in at least one direction, is nor less than 0.3 μm, and the arithmetic mean roughness Ra thereof, in all directions, is not more than 4.0 μm.

12. A conductive material for a connecting part, according to claim 9, wherein an average interval between projections and depressions on the surface of the base material, in at least one direction, is in a range of 0.01 to 3.5 mm.

13. A conductive material for a connecting part, according to claim 9, wherein an average material surface exposure interval between portions of the Cu—Sn alloy covering layer, exposed to the surface of the conductive material, in at least one direction, is in a range of 0.01 to 0.5 mm.

14. A conductive material for a connecting part, according to claim 9, further comprising a Cu covering layer formed between the surface of the base material, and the Cu—Sn alloy covering layer.

15. A conductive material for a connecting part, according to claim 9, further comprising an Ni covering layer formed between the surface of the base material, and the Cu—Sn alloy covering layer.

16. A conductive material for a connecting part, according to claim 15, further comprising a Cu covering layer formed between the Ni covering layer, and the Cu—Sn alloy covering layer.

* * * * *